US011642859B2

(12) United States Patent
Werntges et al.

(10) Patent No.: US 11,642,859 B2
(45) Date of Patent: May 9, 2023

(54) SYSTEMS AND METHODS FOR MANUFACTURING LARGE CONTOURED PARTS FROM THERMOPLASTIC LAMINATE SHEETS

(71) Applicant: The Boeing Company, Chicago, IL (US)

(72) Inventors: Paul G. Werntges, Charleston, SC (US); Gregory J. Hickman, Charleston, SC (US)

(73) Assignee: The Boeing Company, Arlington (VA)

( * ) Notice: Subject to any disclaimer, the term of this patent is extended or adjusted under 35 U.S.C. 154(b) by 267 days.

(21) Appl. No.: 16/865,902

(22) Filed: May 4, 2020

(65) Prior Publication Data
US 2021/0339483 A1    Nov. 4, 2021

(51) Int. Cl.
  *B29C 70/46*    (2006.01)
  *B29C 70/56*    (2006.01)
  (Continued)

(52) U.S. Cl.
  CPC .......... *B29C 70/46* (2013.01); *B29C 35/0288* (2013.01); *B29C 70/541* (2013.01);
  (Continued)

(58) Field of Classification Search
  CPC ....... B29C 70/34; B29C 70/342; B29C 70/42; B29C 70/44; B29C 70/56; B29C 70/541;
  (Continued)

(56) References Cited

U.S. PATENT DOCUMENTS 10,449,736 B2    10/2019    Prebil et al.
2010/0263789 A1*    10/2010    Graber .................... B29C 70/56
                                                                        156/228

(Continued)

FOREIGN PATENT DOCUMENTS

EP    1393875    3/2004
GB    2267457    12/1993
WO    2014/126139    8/2014

OTHER PUBLICATIONS

U.S. Appl. No. 16/670,414, filed Oct. 31, 2019.
Combined Search and Examination Report for UK Patent Application No. GB2104608.1 dated Sep. 21, 2021.

*Primary Examiner* — Jerzi H Moreno Hernandez
(74) *Attorney, Agent, or Firm* — Kunzler Bean & Adamson

(57) ABSTRACT

A system for manufacturing a part that includes a mold, a first fixation component, fixed to the mold, second fixation components, each configured to be fixed to a consolidated laminate sheet, third fixation components, each fixed to the mold. The system also includes tension straps. The first fixation component is configured to attach the consolidated laminate sheet to the mold so that the consolidated laminate sheet does not translationally move relative to the forming surface of the mold. Each one of the second fixation components is configured to attach the tension straps to the consolidated laminate sheet. Each one of the third fixation components is configured to attach the tension straps to the mold so that the tension straps are movable relative to the mold. The system also includes a heating assembly and a strap retraction mechanism, configured to retract the tension strap.

20 Claims, 20 Drawing Sheets

(51) Int. Cl.
    *B29C 70/54*         (2006.01)
    *B29C 35/02*         (2006.01)
    *B29K 105/12*        (2006.01)
    *B29C 33/42*         (2006.01)

(52) U.S. Cl.
    CPC .............. *B29C 70/56* (2013.01); *B29C 33/42* (2013.01); *B29K 2105/12* (2013.01)

(58) Field of Classification Search
    CPC ....... B29C 51/08; B29C 51/18; B29C 51/421; B29C 33/42; B29C 33/3642
    See application file for complete search history.

(56) References Cited

U.S. PATENT DOCUMENTS

| | | | |
|---|---|---|---|
| 2014/0190047 A1* | 7/2014 | McCoy | A41H 15/00 38/102.91 |
| 2015/0151507 A1* | 6/2015 | Edelmann | B32B 5/02 156/196 |
| 2015/0183171 A1 | 7/2015 | Kline et al. | |
| 2016/0325331 A1* | 11/2016 | Gane | B21D 53/78 |
| 2017/0028655 A1 | 2/2017 | Ferrer et al. | |
| 2018/0311887 A1 | 11/2018 | Erickson et al. | |
| 2020/0282666 A1 | 9/2020 | Lathrop et al. | |
| 2021/0060819 A1* | 3/2021 | Sekine | B29C 70/46 |
| 2021/0101318 A1* | 4/2021 | Rodgers | B29C 43/36 |

\* cited by examiner

SYSTEMS AND METHODS FOR MANUFACTURING LARGE CONTOURED PARTS FROM THERMOPLASTIC LAMINATE SHEETS

FIELD

This disclosure relates generally to manufacturing parts, and more particularly to systems and methods for manufacturing parts made from consolidated laminate sheets.

BACKGROUND

At present, systems and methods for manufacturing large contoured parts made of polymer-based laminate sheets are more conducive to thermoset materials. In other words, current manufacturers are reluctant to manufacture large contoured parts made of thermoplastic laminate sheets because conventional consolidation processes for forming large contoured parts made of thermoplastic laminate sheets is time consuming and expensive. Instead, most manufacturers looking to make large contoured parts out of polymer-based laminate sheets do so using thermoset materials, even though thermoset materials can be more expensive, heavier, and unnecessarily stronger than thermoplastic materials. Accordingly, there is a need to manufacture large contoured parts made of thermoplastic laminate sheets in a manner that is easier, cheaper, and faster than conventional manufacturing methods.

SUMMARY

The subject matter of the present application has been developed in response to the present state of the art, and in particular, in response to the shortcomings of conventional systems and methods for manufacturing large contoured parts made of thermoplastic laminate sheets, that have not yet been fully solved by currently available techniques. Accordingly, the subject matter of the present application has been developed to provide systems and methods for manufacturing large contoured parts from thermoplastic laminate sheets that overcome at least some of the above-discussed shortcomings of prior art techniques.

The following is a non-exhaustive list of examples, which may or may not be claimed, of the subject matter, disclosed herein.

Disclosed herein is a method of manufacturing a part. The method comprises heating a consolidated laminate sheet, comprising multiple plies each made of fibers embedded in a thermoplastic resin, to a heated temperature below a melting temperature of the thermoplastic resin to form a heated consolidated laminate sheet. The method also comprises forcing the heated consolidated laminate sheet against a contoured forming surface of a mold until a shape of the heated consolidated laminate sheet corresponds with a contoured shape of the contoured forming surface of the mold. The preceding subject matter of this paragraph characterizes example 1 of the present disclosure.

The fibers embedded in the thermoplastic resin comprise continuous fibers. The preceding subject matter of this paragraph characterizes example 2 of the present disclosure, wherein example 2 also includes the subject matter according to example 1, above.

The heated temperature is above a heat deflection temperature of the thermoplastic resin. The preceding subject matter of this paragraph characterizes example 3 of the present disclosure, wherein example 3 also includes the subject matter according to any one of examples 1 or 2, above.

The contoured forming surface of the mold is a ruled surface. The preceding subject matter of this paragraph characterizes example 4 of the present disclosure, wherein example 4 also includes the subject matter according to any one of examples 1-3, above.

The consolidated laminate sheet has a width of at least three feet and a length of at least four feet. The preceding subject matter of this paragraph characterizes example 5 of the present disclosure, wherein example 5 also includes the subject matter according to any one of examples 1-4, above.

The consolidated laminate sheet has a porosity of no more than 4%. The preceding subject matter of this paragraph characterizes example 6 of the present disclosure, wherein example 6 also includes the subject matter according to any one of examples 1-5, above.

The method further comprises positioning the consolidated laminate sheet and the mold within an interior cavity of an enclosed container. The step of heating the consolidated laminate sheet comprises heating the interior cavity of the enclosed container. The preceding subject matter of this paragraph characterizes example 7 of the present disclosure, wherein example 7 also includes the subject matter according to any one of examples 1-6, above.

The method further comprises hermetically dividing the interior cavity of the enclosed container into a first region and a second region with a flexible diaphragm. The step of positioning the consolidated laminate sheet and the mold within the interior cavity comprises positioning the consolidated laminate sheet and the mold within the second region of the interior cavity. The step of forcing the heated consolidated laminate sheet against the contoured forming surface of the mold comprises changing a pressure within at least one of the first region and the second region such that the pressure within the first region is greater than the pressure within the second region to urge the flexible diaphragm against the heated consolidated laminate sheet. The preceding subject matter of this paragraph characterizes example 8 of the present disclosure, wherein example 8 also includes the subject matter according to example 7, above.

The method further comprises positioning a flexible heating element proximate the consolidated laminate sheet. The step of heating the consolidated laminate sheet comprises flexing the flexible heating element to conform to the shape of the heated consolidated laminate sheet as the heated consolidated laminate sheet is forced against the contoured forming surface of the mold. The preceding subject matter of this paragraph characterizes example 9 of the present disclosure, wherein example 9 also includes the subject matter according to any one of examples 1-8, above.

The method further comprises coupling at least one tension strap with the consolidated laminated sheet. The step of forcing the heated consolidated laminate sheet against the contoured forming surface of the mold comprises pulling the at least one tension strap relative to the mold. The preceding subject matter of this paragraph characterizes example 10 of the present disclosure, wherein example 10 also includes the subject matter according to any one of examples 1-9, above.

The method further comprises coupling at least one drive mechanism to the consolidated laminate sheet. The contoured shape of the contoured forming surface of the mold is concave. The step of forcing the heated consolidated laminate sheet against the contoured forming surface of the mold comprises engaging the heated consolidated laminate sheet via operation of the drive mechanism such that the heated consolidated laminate sheet buckles into contact against the contoured forming surface of the mold. The preceding subject matter of this paragraph characterizes example 11 of the present disclosure, wherein example 11 also includes the subject matter according to any one of examples 1-10, above.

Further disclosed herein is a system for manufacturing a part. The system comprises a mold, comprising a contoured forming surface. The system also comprises at least one tension strap, configured to attach to a consolidated laminate sheet. The system further comprises a heating assembly, positioned relative to the mold and configured to supply heat to the consolidated laminate sheet, when attached to the at least one tension strap, to form a heated consolidated laminate sheet. The system additionally comprises a strap retraction mechanism, configured to retract the at least one tension strap, when attached to the consolidated laminate sheet, to force the heated consolidated laminate sheet against the contoured forming surface of the mold. The preceding subject matter of this paragraph characterizes example 12 of the present disclosure.

The system further comprises an enclosed container, defining an interior cavity. The mold, the at least one tension strap, the heating assembly, and the strap retraction mechanism are enclosed within the enclosed container. The heating assembly comprises a heater, which is non-movably fixed relative to the enclosed container. The preceding subject matter of this paragraph characterizes example 13 of the present disclosure, wherein example 13 also includes the subject matter according to example 12, above.

The heating assembly comprises a flexible heating element configured to flex to conform to a shape of the heated consolidated laminate sheet as the heated consolidated laminate sheet is forced against the contoured forming surface of the mold. The preceding subject matter of this paragraph characterizes example 14 of the present disclosure, wherein example 14 also includes the subject matter according to any one of examples 12-13, above.

The flexible heating element is configured to attach to the consolidated laminate sheet. The flexible heating element comprises a plurality of stand-offs configured to attach to the consolidated laminate sheet and a plurality of heaters each configured to generate heat and to separately attach to the consolidated laminate sheet via a corresponding one of the plurality of stand-offs. The preceding subject matter of this paragraph characterizes example 15 of the present disclosure, wherein example 15 also includes the subject matter according to example 14, above.

The flexible heating element comprises a plurality of hinges, wherein adjacent ones of the plurality of heaters are pivotably coupled to each other via a corresponding one of the plurality of hinges. The preceding subject matter of this paragraph characterizes example 16 of the present disclosure, wherein example 16 also includes the subject matter according to example 15, above.

The flexible heating element overhangs the consolidated laminate sheet when attached to the at least one tension strap. The flexible heating element comprises a plurality of overhang straps. At least one of the plurality of overhang straps is configured to lengthen relative to at least another one of the plurality of overhang straps. The flexible heating element flexes, to conform to the shape of the heated consolidated laminate sheet, in response to the at least one of the plurality of overhang straps lengthening relative to the at least another one of the plurality of overhang straps. The preceding subject matter of this paragraph characterizes example 17 of the present disclosure, wherein example 17 also includes the subject matter according to any one of examples 14-16, above.

The flexible heating element comprises a heat blanket attached to the plurality of overhang straps. The preceding subject matter of this paragraph characterizes example 18 of the present disclosure, wherein example 18 also includes the subject matter according to example 17, above.

The flexible heating element comprises a plurality of heaters each configured to generate heat and each attached to a corresponding one of the plurality of overhang straps and a plurality of hinges. Adjacent ones of the plurality of heaters are pivotably coupled to each other via a corresponding one of the plurality of hinges. The preceding subject matter of this paragraph characterizes example 19 of the present disclosure, wherein example 19 also includes the subject matter according to any one of examples 17-18, above.

Additionally disclosed herein is a system for manufacturing a part. The system comprises a mold, comprising a contoured forming surface. The system also comprises at least two drive mechanisms. The system further comprises at least two tension straps, each configured to attach to one of two opposing end portions of the consolidated laminate sheet and a corresponding one of the at least two drive mechanisms. The system additionally comprises a heating assembly, positioned relative to the mold and configured to supply heat to the consolidated laminate sheet, when attached to the at least two tension straps, to form a heated consolidated laminate sheet. when the at least two tension straps are attached to the two opposing end portions of the consolidated laminate sheet and the at least two drive mechanisms, the at least two drive mechanisms are operable to move toward each other to cause the two opposing end portions of the consolidated laminate sheet to move toward each other and an intermediate portion of the consolidated laminate sheet to buckle toward the contoured forming surface of the mold. The preceding subject matter of this paragraph characterizes example 20 of the present disclosure.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

The systems and methods disclosed herein enable the manufacturing of large contoured parts made of thermoplastic materials. Currently, manufacturers are reluctant to manufacture large parts made of thermoplastic materials because, as presented above, the conventional consolidation process for forming large contoured parts is time consuming and expensive. The systems and methods disclosed herein help to reduce the time and cost for manufacturing large contoured parts made of thermoplastic materials by utilizing substantially flat consolidated laminate sheets of thermoplastic materials. Because consolidating flat laminate sheets is easier, cheaper, and faster than consolidating contoured laminate sheets, the systems and methods of the present disclosure provide improvements over conventional systems and methods.

Figure 1:
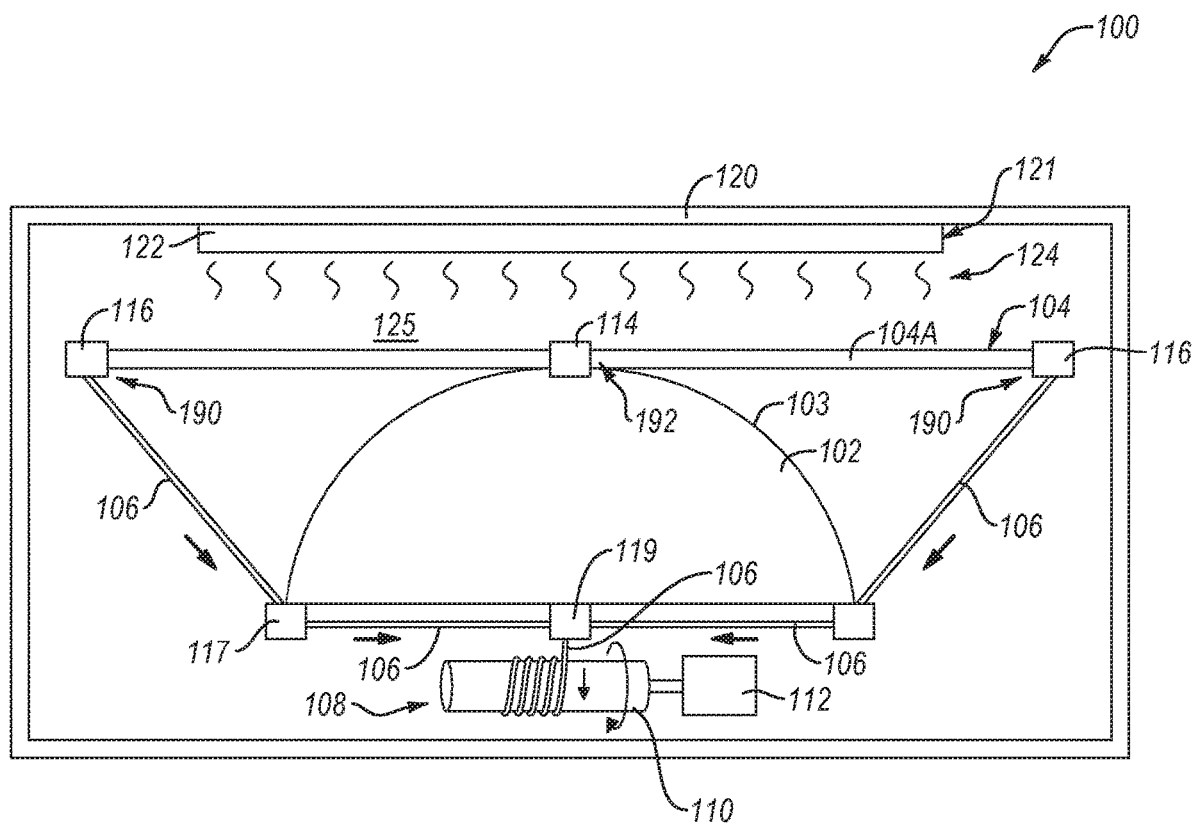
FIG. 1 is a schematic, elevation view of a system for manufacturing a part, according to one or more examples of the present disclosure.
Figure 2:
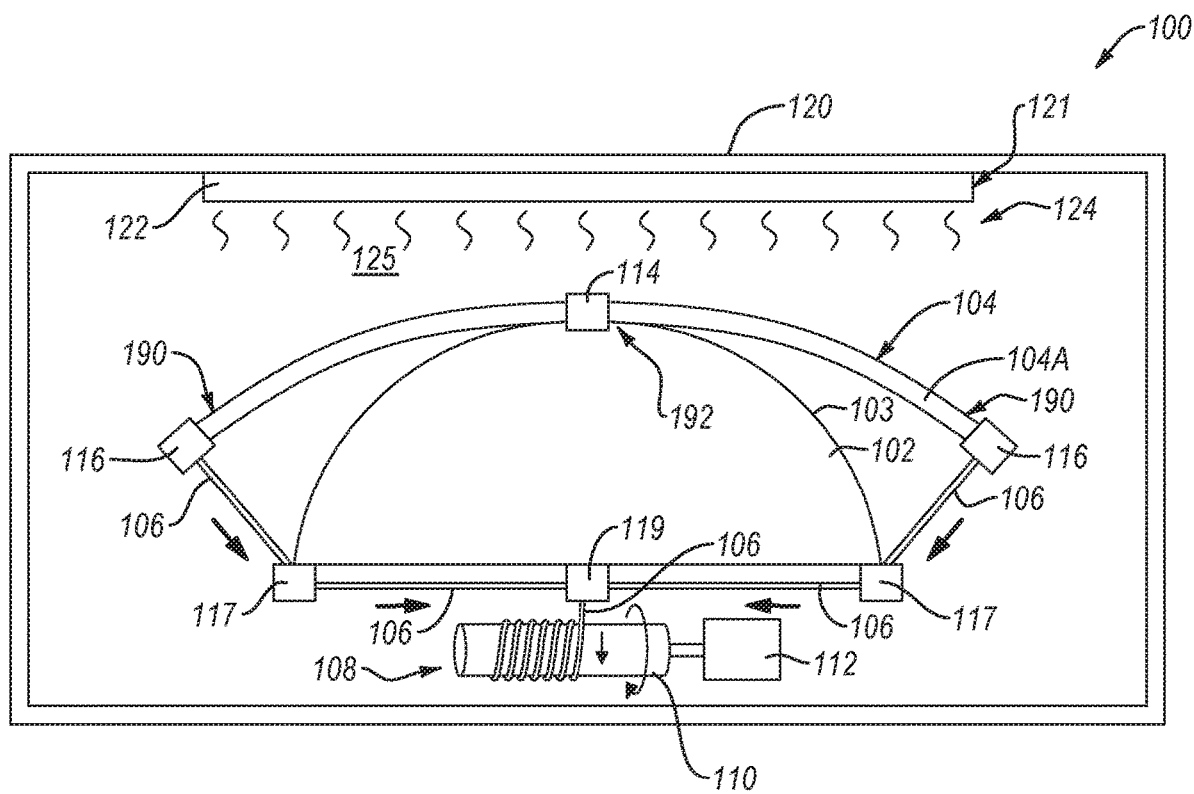
FIG. 2 is a schematic, elevation view of the system of FIG. 1, showing a partial deformation of a heated consolidated laminate sheet, according to one or more examples of the present disclosure.
Figure 3:
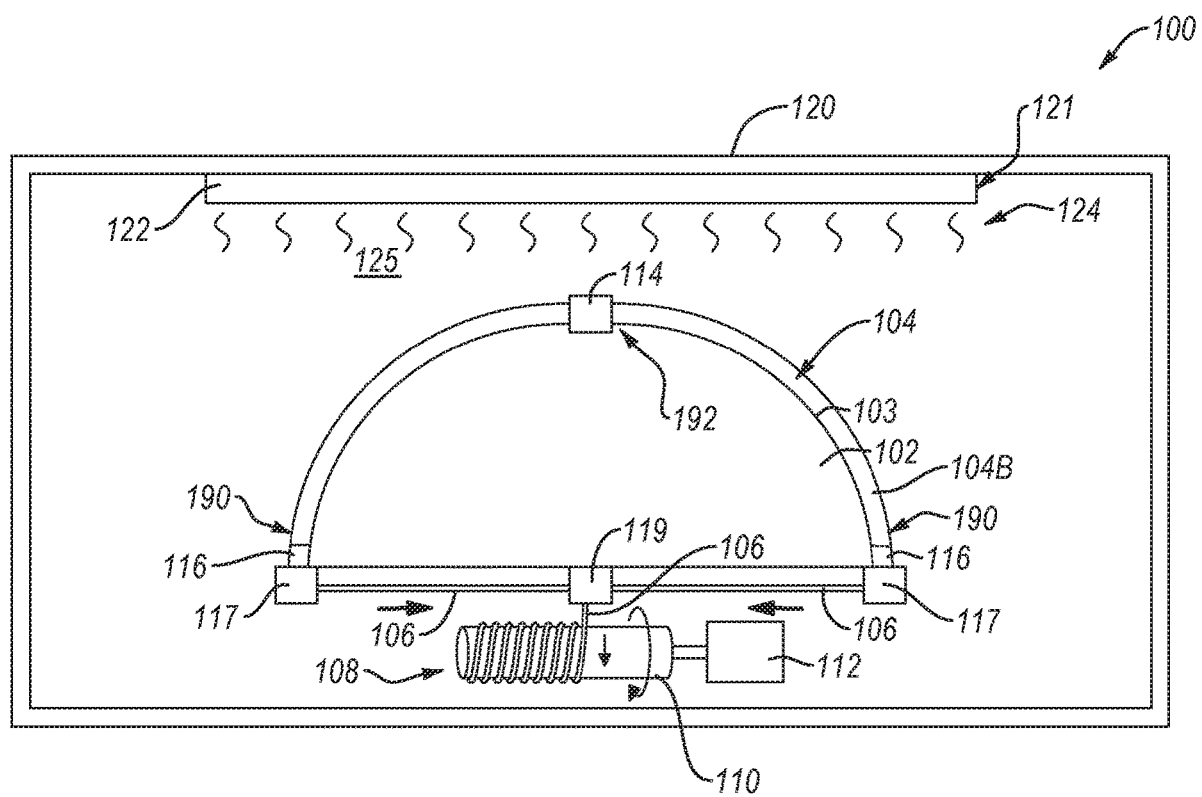
FIG. 3 is a schematic, elevation view of the system of FIG. 1, showing a full deformation of a heated consolidated laminate sheet, according to one or more examples of the present disclosure.

Referring to FIGS. 1-3, according to one example, a system 100 for manufacturing a part 104B includes a mold 102, at least one tension strap 106, and a heating assembly 121. The mold 102 or tool includes a contoured forming surface 103. The contoured forming surface 103 has a shape that corresponds with a shape of the part 104B formed by the system 100. More specifically, the contoured formed surface 103 is used as a template to shape a consolidated laminate sheet 104 into a shape that matches the shape of the contoured forming surface 103. The contoured forming surface 103 is non-planar and has any of various ruled shapes. In other words, the contoured forming surface 103 is a ruled surface that defines a ruled shape. As used herein, a ruled surface is a surface where, for every point on the surface, there is a straight line that passes through the point and lies on the surface. Examples of a ruled surface include all or part of the surface of a cylinder, a cone, etc. Moreover, according to some examples, the contoured forming surface 103, in addition to being a ruled surface, does not have point of inflection. Accordingly, the contoured forming surface 103, in some examples, is only concave or only convex. For example, the contoured forming surface 103 of the mold 102 in FIGS. 1-9, 14, and 15 is only convex. In contrast, the contoured forming surface 103 of the mold 102 in FIGS. 10-13 is only concave.

The mold 102 is made of a material that is sufficiently rigid and strong to withstand high temperatures. In some examples, the mold 102 is made of a metallic material, such as steel.

In the system 100 of FIGS. 1-3, the consolidated laminate sheet 104 is temporarily fixed to the mold 102 with a first fixation component 114. The first fixation component 114 helps to locate the consolidated laminate sheet 104 relative to the mold 102 and keep the consolidated laminate sheet 104 from translationally moving relative to the mold 102 as the consolidated laminate sheet 104 is formed into the part 104B. In some examples, the first fixation component 114 is a clamp that is configured to releasably clamp the consolidated laminate sheet 104 to the mold 102. In other examples, the first fixation component 114 is a fastener that penetrates the consolidated laminate sheet 104. According to the example shown in FIGS. 1-3, the first fixation component 114 is fixed to an intermediate portion 192 (e.g., middle or center portion) of the consolidated laminate sheet 104, which is between (e.g., equidistant from) two opposing end portions 190 of the consolidated laminate sheet 104.

Each tension strap 106 of the system 100 is configured to attach to the consolidated laminate sheet 104. The tension strap 106 is an elongated flexible component capable of withstanding tensile forces sufficient to pull on and deform the consolidated laminate sheet. In some examples, the tension strap 106 is an interwoven strip of fabric. However, in other examples, the tension strap 106 is a chain, chord, belt, or other similar component.

In some examples, the tension straps 106 are temporarily attached to the consolidated laminate sheet 104. According to one example, the tension straps 106 are attached to the consolidated laminate sheet 104 with second fixation components 116. Each one of the second fixation components 116 helps to secure the tension strap 106 to the consolidated laminate sheet 104 and enable the tension strap 106 to pull on the consolidated laminate sheet 104. In some examples, the second fixation component 116 is a clamp or fastener. According to one example, the second fixation component 116 is a pull ring. The second fixation component 116 is attached to an excess material portion of the consolidated laminate sheet 104 in certain examples. For example, as shown, the second fixation component 116 is attached to one of two opposing end portions 190 of the consolidated laminate sheet 104. The two opposing end portions 190 are excess material portions of the consolidated laminate sheet 104, which can be removed from the part 104B and discarded.

In the example shown in FIGS. 1-3, the system 100 includes at least two tension straps 106 with each tension strap 106 attached to a corresponding one of the two opposing end portions 190 with a corresponding one of two second fixation components 116. Accordingly, the tension straps 106 extend from the second fixation components 116 on opposite sides of the mold 102. From the second fixation components 116, the tension straps 106 are movably attached to the mold 102 with third fixation components 117. The third fixation components 117 are fixed to the mold 102 and retain corresponding ones of the tension straps 106 relative to the mold 102 in a manner that enables the tension straps 106 to move relative to the mold 102. In one example, each one of the third fixation components 117 is one or more feed loops or pulleys that receive and guide the tension straps 106 along a path adjacent and fixed relative to the mold 102.

The two tension straps 106 converge at a fourth fixation component 119 that is fixed to the mold 102 at a location between the third fixation components 117. The fourth fixation component 119 retains the tension straps 106 relative to the mold 102 in a manner that enables the tension straps 106 to move relative to the mold 102. In one example, the fourth fixation component 119 is one or more feed loops or pulleys that receives and guides the tension straps 106 along a path, adjacent and fixed relative to the mold 102, from the third fixation components 117.

From the fourth fixation component 119, the tension straps 106 are fed to a strap retraction mechanism 108 of the system 100. The strap retraction mechanism 108 is configured to retract the tension straps 106 attached to the consolidated laminate sheet 104. As shown with directional arrows, the strap retraction mechanism 108 retracts or pulls the tension straps 106 along the mold 102, through the third fixation components 117 and the fourth fixation component 119, and into the strap retraction mechanism 108. Because the tension straps 106 are attached to the consolidated laminate sheet 104, retraction of the tension straps 106 by the strap retraction mechanism 108 pulls on the opposing end portions 190 of the consolidated laminate sheet 104 in the direction indicated by directional arrows.

The strap retraction mechanism 108 is any of various mechanisms configured to retract the tension straps 106. In the illustrated example, the strap retraction mechanism 108 includes a rotatable drum 110 and a motor 112. The motor 112 is selectively operable to rotate the rotatable drum 110. As the rotatable drum 110 rotates, which is indicated by a rotational direction arrow, the tension straps 106 are wound on the rotatable drum 110. Winding the tension straps 106 on the rotatable drum 110 maintains tension in the tension straps 106 as the tension straps 106 are retracted by the strap retraction mechanism 108.

The heating assembly 121 of the system 100 is configured to supply heat 124. Moreover, the heating assembly 121 is positioned relative to the mold 102 such that heat generated by the heating assembly 121 heats the consolidated laminate sheet 104 when attached to the tension straps 106. In the system 100, the heating assembly 121 includes a heater 122. The heater 122 can be any of various types of heaters, such as resistance heaters, thermoelectric heaters, radiant heaters, and the like. The heater 122 of the system 100 is non-flexible in some examples.

The system 100 additionally includes an enclosed container 120 that defines an interior cavity 125. The walls of the enclosed container 120 are thermally insulative to resist the transfer of heat out of the interior cavity 125. As used herein, the enclosed container 120 can be an enclosable container such that the enclosed container 120 can be opened to allow parts of the system 100 to be located within the interior cavity 125 and closed to enclose the interior cavity 125. For example, the mold 102, the tension straps 106, and the strap retraction mechanism 108 of the system 100 and the consolidated laminate sheet 104 are located within the interior cavity 125 of the enclosed container 120. The heater 122 is also located within the interior cavity 125 of the enclosed container 120 and the heat 124 generated by the heater 122 raises the overall temperature of the interior cavity 125. Accordingly, the enclosed container 120 functions as a simple oven in some examples. In certain examples, the heater 122 is non-movably fixed relative to the enclosed container 120 and the mold 102. Because the heater 122 is attached to the enclosed container 120 and not attached to the consolidated laminate sheet 104 directly, the heater 122 can be positioned anywhere relative to the enclosed container 120 to supply heat to the interior cavity 125 of the enclosed container 120.

Figure 16:
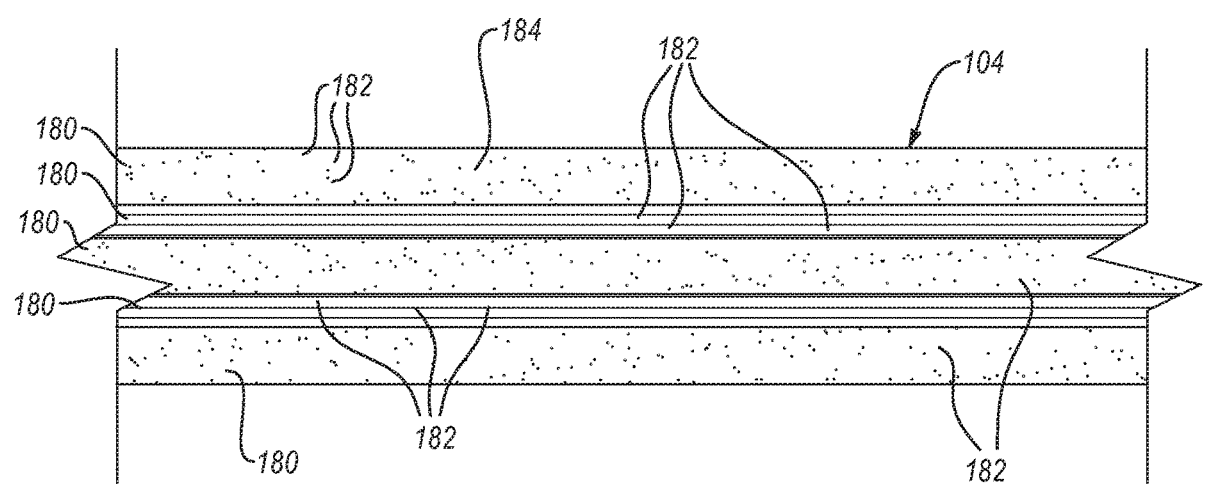
FIG. 16 is a schematic, elevation, sectional view of a consolidated laminate sheet, according to one or more examples of the present disclosure.

Referring to FIG. 16, the consolidated laminate sheet 104 comprises multiple plies each made of fibers embedded in a thermoplastic resin. The consolidated laminate sheet 104 that is shaped by the systems disclosed herein includes multiple plies 180 in a stacked arrangement. Each one of the plies 180 includes fibers 182 embedded in a thermoplastic resin 184. Accordingly, each one of the plies 180 is made of a fiber-reinforced thermoplastic polymer. In some examples, the fibers 182 of each ply 180 are multidirectional and non-continuous. However, in the illustrated example of FIG. 16, the fibers 182 of each ply 180 are unidirectional and continuous. As used herein, a fiber 182 is continuous if it extends across an entirety of the ply 180 (e.g., across an entire width or an entire length of the ply). In some examples, the common direction of the fibers 182 of one ply 180 of the consolidated laminate sheet 104 is different than the common direction of the fibers 182 of an adjacent ply 180 of the consolidated laminate sheet 104. For example, as shown, the fibers 182 of three of the plies 180 are directed into the page, while the fibers 182 of two of the plies 180 are directed from left-to-right across the page. Of course, the fibers 182 of a given ply 180 of the consolidated laminate sheet 104 can be directed in any of various common directions (e.g., 0-degrees, 90-degrees, +/−45-degrees, and the like).

The thermoplastic resin 184 of the plies 180 of the consolidated laminate sheet 104 is made of any of various thermoplastic materials, such as amorphous thermoplastics (e.g., polycarbonate, acrylic, polyethylene terephthalate glycol (PETG), acrylonitrile butadiene styrene (ABS), polyetherimide (PEI), and the like) semi-crystalline or crystalline thermoplastic materials (e.g., polyethylene, polyether ether ketone (PEEK), polyetherketoneketone (PEKK), polypropylene, nylon, acetal, fluoropolymers, and the like). Whereas thermoset composite parts undergo an irreversible curing process during fabrication, thermoplastic materials can be heated and re-formed many times into different shapes. However, thermoplastic materials generally have lower melting temperatures than cured thermoset materials. Additionally, the layup and consolidation process for fiber-reinforced thermoplastic polymers is generally more difficult and complex compared to fiber-reinforced thermoset polymers. For example, prior to forming into a part, laminate sheets of fiber-reinforced thermoplastic polymers are consolidated to reduce the porosity of the laminate sheets, thereby strengthening the laminate sheets. Consolidation of a laminate sheet typically includes applying heat and pressure to the laminate sheet until the plies are flattened and volatiles are effectively squeezed out of the laminate sheet. Conventionally, laminate sheets made of thermoplastic resins are laid up into a desired final shape of a part and consolidated in place. While this process may be practical for small parts, it is not practical for large parts as the consolidation process is typically conducted within a pressurized environment, such as an autoclave, and laying up large plies of thermoplastic resin into a contoured shape is difficult. However, laying up large laminate plies made of thermoplastic resins into a planar shape and consolidating the planar plies in a heated and pressurized environment is less difficult and more economically feasible.

Accordingly, the consolidated laminate sheet 104 is a fully consolidated and planar laminate sheet made of a thermoplastic resin. In some examples, fully consolidated means equal to or less than 1% porosity. In other examples, fully consolidated means equal to or less than 4% porosity. In view of the foregoing, when introduced to the system 100, the consolidated laminate sheet 104 has been preformed in advance as a flat and rigid (e.g., hardened) laminated sheet. Moreover, in certain examples, the consolidated laminate sheet 104 is a large consolidated laminate sheet. As used herein, a large consolidated laminate sheet is a consolidated laminate sheet that has a width of at least three feet and a length of at least four feet. In one example, the consolidated laminate sheet 104 has a width of at least four feet and a length of at least ten feet. In yet another example, the consolidated laminate sheet 104 has a width of at least twenty feet and a length of at least thirty feet.

Figure 20:
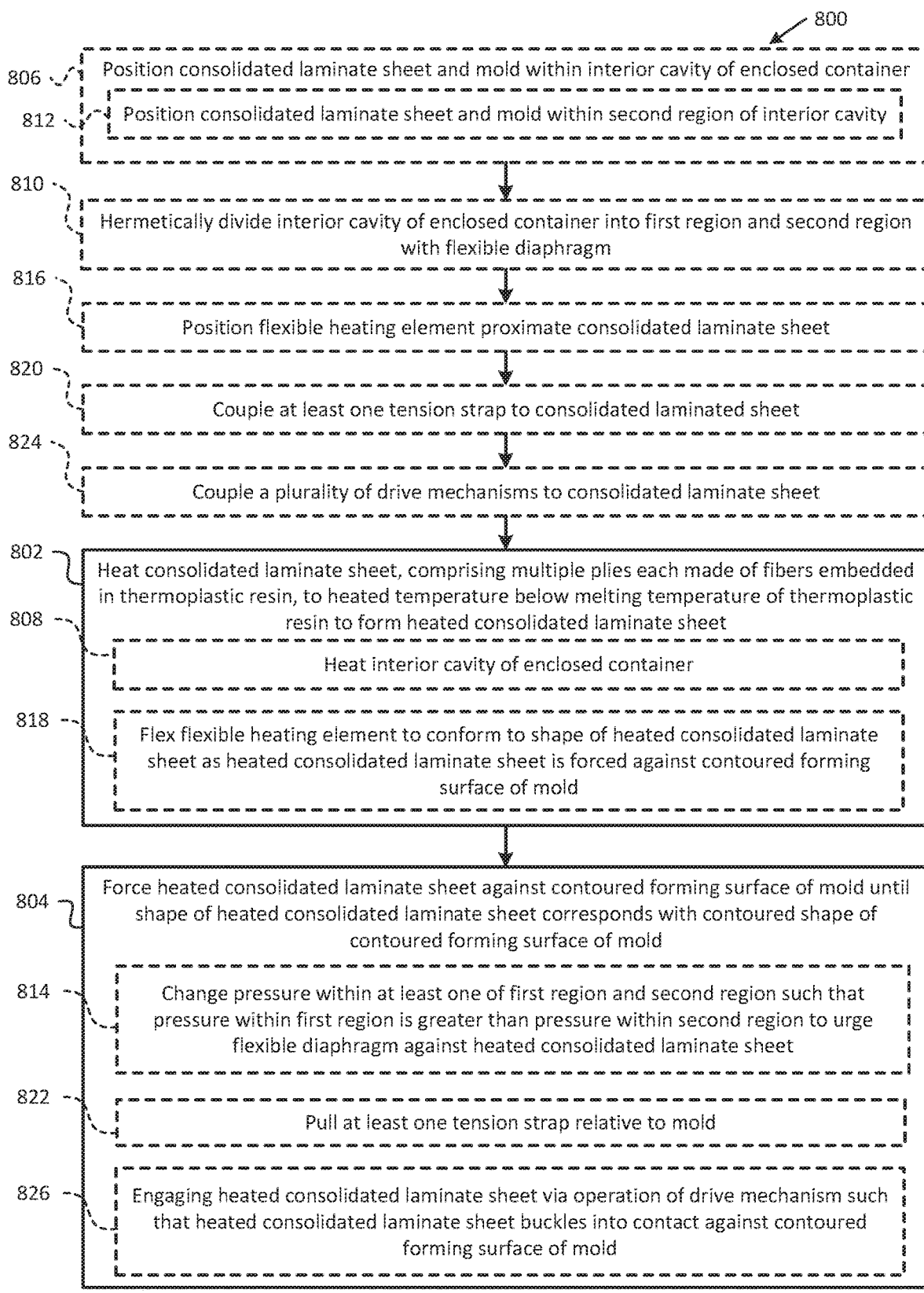
FIG. 20 is a block diagram of a method of manufacturing a part, according to one or more examples of the present disclosure.

Referring to FIG. 20, according to one example, a method 800 of manufacturing a part 104B from the consolidated laminate sheet 104 includes (block 802) heating the consolidated laminate sheet 104 to a heated temperature, below a melting temperature of the thermoplastic resin 184 of the consolidated laminate sheet 104, to form a heated consolidated laminate sheet 104A (see, e.g., FIG. 1). Accordingly, according to the method 800, the consolidated laminate sheet 104 is heated to a heated temperature, which can be a submelt temperature of the thermoplastic resin 184 or a temperature below the temperature at which the thermoplastic resin 184 begins to flow. Moreover, the heated temperature is above a heat deflection temperature (e.g., heat distortion temperature) of the thermoplastic resin 184. Generally, the heat deflection temperature of the thermoplastic resin 184 is the temperature at which the thermoplastic resin 184 deforms under a load. More specifically, as used herein, a heat deflection temperature is the temperature at which a predetermined bar of the thermoplastic resin 184 will deform a predetermined amount under a predetermined load. In view of the foregoing, as used herein, the heated temperature is a temperature of the thermoplastic resin 184 that enables forced deformation of the heated consolidated laminate sheet 104A, without pressure above atmospheric pressure or pressure just above atmospheric pressure being applied to the heated consolidated laminate sheet 104A and without deconsolidation of and creation of porosities in the heated consolidated laminate sheet 104A.

Referring to FIGS. 1-3 and 20, when executed in association with the system 100, the method 800 further includes (block 806) positioning the consolidated laminate sheet 104 and the mold 102 within the interior cavity 125 of the enclosed container 120. According to block 802 of the method 800, the consolidated laminate sheet 104 is heated by (block 808) heating the interior cavity 125 of the enclosed container 120, via operation of the heater 122 of the heating assembly 121, to a temperature sufficient to raise the temperature of the thermoplastic resin 184 above a heat deflection temperature of the thermoplastic resin 184 and below the melting temperature of the thermoplastic resin 184.

After the consolidated laminate sheet 104 is heated to form the heated consolidated laminate sheet 104A, the method 800 includes (block 804) forcing the heated consolidated laminate sheet 104A against the contoured forming surface 103 of the mold 102 until the shape of the heated consolidated laminate sheet 104A corresponds with the contoured shape of the contoured forming surface 103 of the mold 102. Referring to FIGS. 1-3 and 20, when executed in association with the system 100, the method 800 further includes (block 820) coupling at least one tension strap 106 with the consolidated laminated sheet 104. With the system 100, block 820 of the method 800 includes attaching one tension strap 106 to one of the opposing end portions 190 of the consolidated laminate sheet 104 via one of the second fixation components 116 and attaching another tension strap 106 to the other of the opposing end portions 190 of the consolidated laminate sheet 104 via another one of the second fixation components 116. When executed by the system 100, forcing the heated consolidated laminate sheet 104A against the contoured forming surface 103 of the mold 102 includes (block 822) pulling the tension straps 106 relative to the mold 102.

As shown by directional arrows in FIG. 1, the tension straps 106 are pulled relative to the mold 102 as the tension straps are drawn into the strap retraction mechanism 108. Referring to FIG. 2, the pulling force generated by the strap retraction mechanism 108 is sufficient to deform the heated consolidated laminate sheet 104A. With the intermediate portion 192 effectively anchored to the mold 102 by the first fixation component 114, deformation of the heated consolidated laminate sheet 104A initially occurs at the intermediate portion 192 to allow the opposing end portions 190 of the heated consolidated laminate sheet 104A to be pulled downward toward the mold 102. Further deformation of the heated consolidated laminate sheet 104A occurs along the heated consolidated laminate sheet 104A towards the opposing end portions 190 until, as shown in FIG. 3, the heated consolidated laminate sheet 104A has been sufficiently deformed against the contoured forming surface 103 of the mold 102 to form the part 104B. By keeping the heated temperature below the melting temperature of the thermoplastic resin 184, the viscosity of the thermoplastic resin 184 is high enough to counteract deconsolidation forces generated, and to prevent the release of residual stress stored in the consolidated laminate sheet 104, as the heated consolidated laminate sheet 104A is shaped into the contoured shape of the part 104B.

Figure 17:
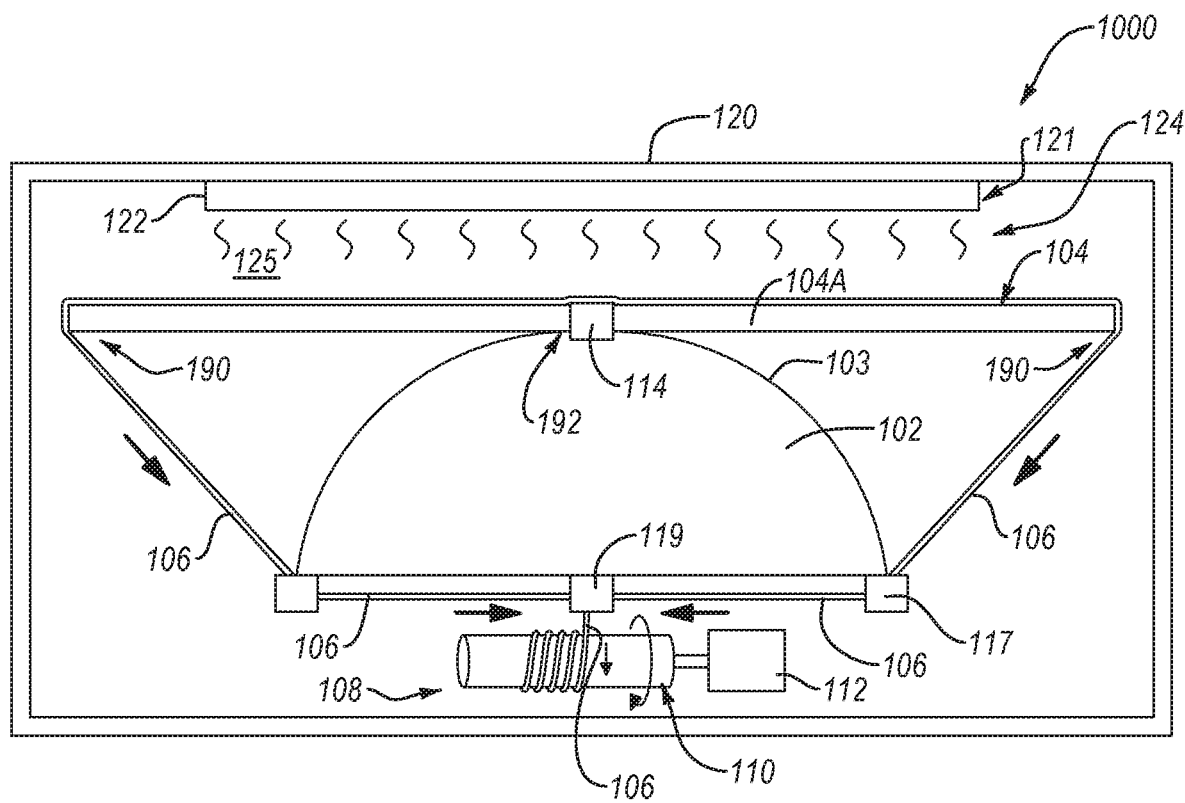
FIG. 17 is a schematic, elevation view of a system for manufacturing a part, according to one or more examples of the present disclosure.

Within examples, the system for manufacturing a part includes one or more tension straps 106 configured to attach to the consolidated laminate sheet 104. For instance, as described with reference to FIGS. 1-3, the system 100 includes two tension straps 106 attached to respective second fixation components 116. According to another example, a system for manufacturing a part includes a single tension strap, as shown in FIG. 17. The system 1000 of FIG. 17 includes some features analogous to the system 100 of FIGS. 1-3, with like numbers referring to like features. However, instead of two tension straps 106 attached to respective second fixation components 116, a single tension strap 106 is wrapped around or covers the consolidated laminate sheet 104. Opposite end portions of the tension strap 106 pass through the third fixation components 117 and the fourth fixation component 119 before engaging with the strap retraction mechanism 108. The tension strap 106 is pulled in a manner similar to that of the system 100 of FIGS. 1-3. However, instead pulling at just the ends of the consolidated laminate sheet 104, as with the system 100 of FIGS. 1-3, the tension strap 106 of the system 1000 of FIG. 17 applies a uniform downward pressure along the consolidated laminate sheet 104 from above the consolidated laminate sheet 104. Such a configuration promotes a more uniform deformation of the consolidated laminated sheet 104. In certain examples, the tension strap 106 of the system 1000 of FIG. 17 is a metallic foil strap.

Figure 4:
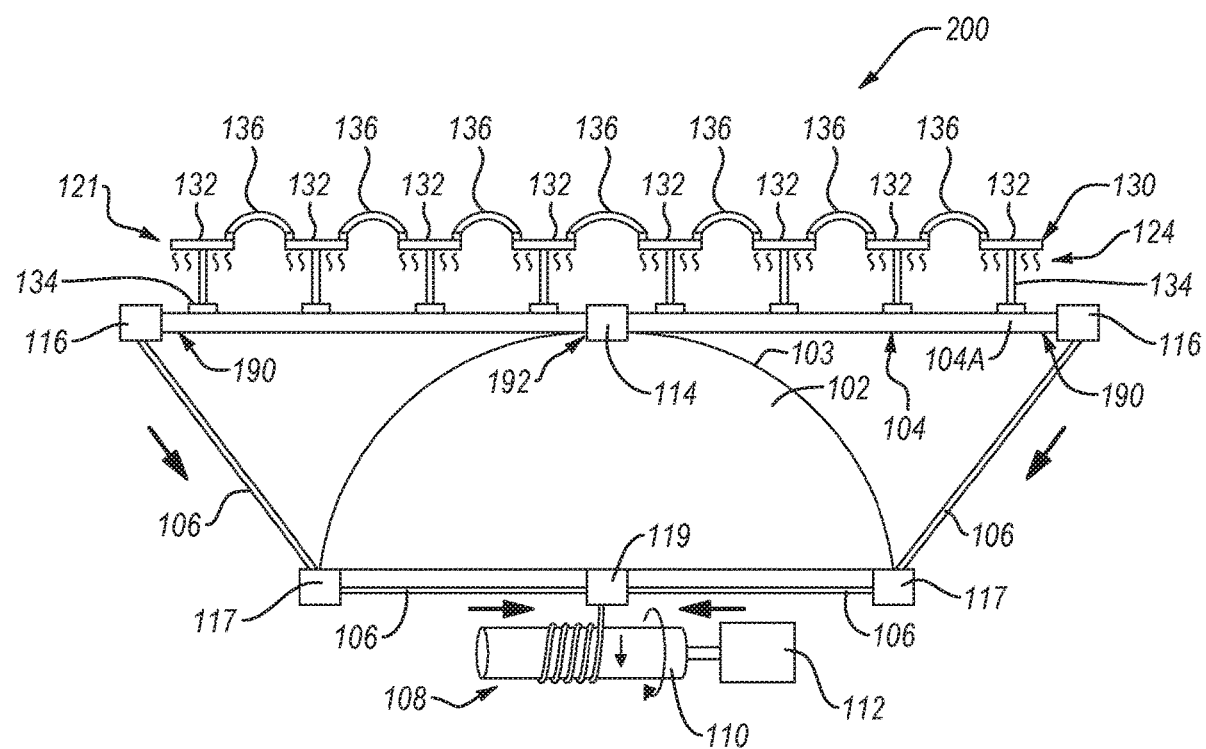
FIG. 4 is a schematic, elevation view of a system for manufacturing a part, according to one or more examples of the present disclosure.
Figure 5:
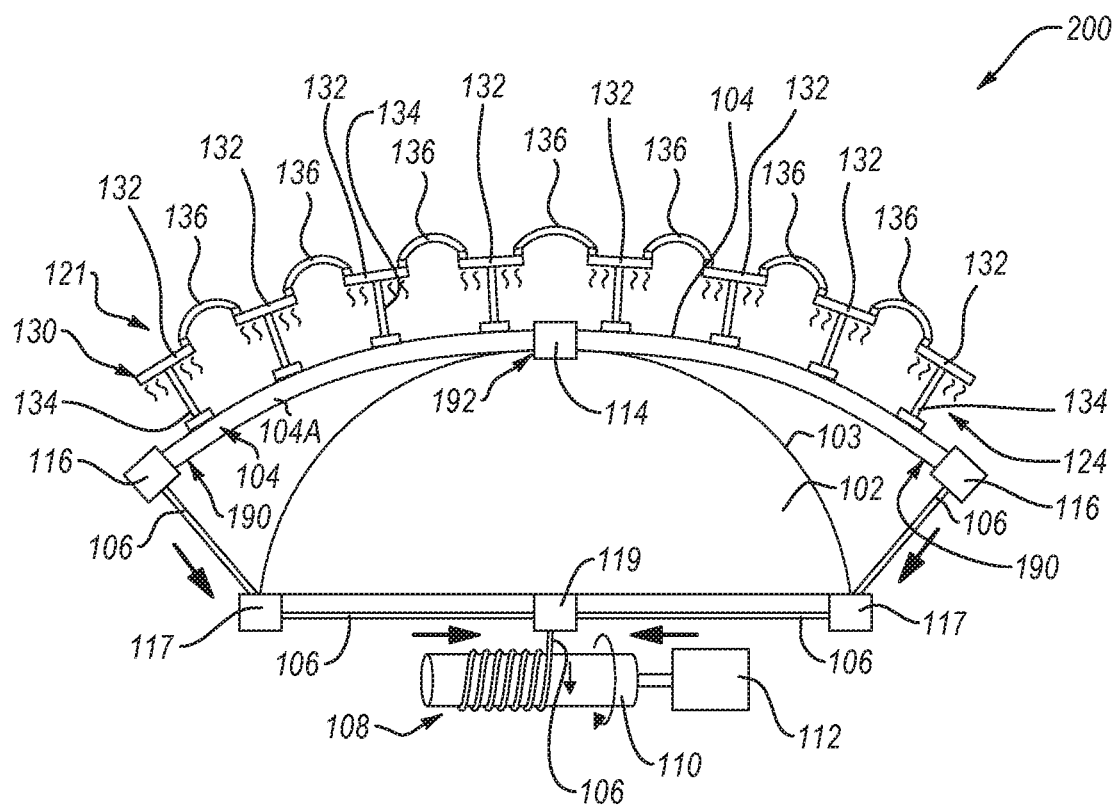
FIG. 5 is a schematic, elevation view of the system of FIG. 4, showing a partial deformation of a heated consolidated laminate sheet, according to one or more examples of the present disclosure.

Referring to FIGS. 4 and 5, according to some examples, a system 200 for manufacturing a part 104B is shown. The system 200 includes some features analogous to the system 100 of FIGS. 1-3, with like numbers referring to like features. For example, like the system 100, the system 200 includes the mold 102, the tension straps 106, the first fixation component 114, the second fixation components 116, the third fixation components 117, the fourth fixation component 119, and the strap retraction mechanism 108. However, unlike the system 100, the system 200 does not include an enclosed container 120.

Moreover, the heating assembly 121 of the system 200, instead of being fixed to an enclosed container like the system 100, is attached directly to the consolidated laminate sheet 104. The heating assembly 121 of the system 200 includes a flexible heating element 130 that is configured to flex to conform to the shape of the heated consolidated laminate sheet 104A as the heated consolidated laminate sheet 104A is forced against the contoured forming surface 103 of the mold 102. The flexible heating element 130 of the system 200 includes a plurality of stand-offs 134 that are releasably fixed to the consolidated laminate sheet 104. In one example, each one of the plurality of stand-offs 134 includes a high-temperature suction cup that is releasably fixed to the consolidated laminate sheet 104 via a suction force, created by the high-temperature suction cup, between the high-temperature suction cup and the consolidated laminate sheet 104. Each one of the plurality of stand-offs 134 additionally includes a stand-off rod that extends from the high-temperature suction cups. The plurality of stand-offs 134 are affixed to an outer surface of the consolidated laminate sheet 104 that faces away from the mold 102.

The flexible heating element 130 further includes a plurality of heaters 132 each separately attached to a corresponding one of the plurality of stand-offs 134. More specifically, each one of the plurality of heaters 132 is fixed to the stand-off rod of one of the plurality of stand-offs 134 such that the plurality of heaters 132 are located a predetermined distance away from the outer surface of the consolidated laminate sheet 104. Each one of the plurality of heaters 132 is configured to generate heat 124 and is rigid in certain examples. In some examples, the plurality of heaters 132 are individually controlled to enable variable heating across the flexible heating element 130. The flexible heating element 130 additionally includes a plurality of hinges 136 each pivotably coupling adjacent ones of the plurality of heaters 132. Accordingly, adjacent ones of the plurality of heaters 132 are coupled by a corresponding one of the plurality of hinges 136. Each one of the plurality of hinges 136 can be one of various hinges capable of facilitating pivotable movement of one heater 132 relative to another heater 132.

Referring to FIGS. 4, 5, and 20, when executed in association with the system 200, the method 800 further includes (block 816) positioning the flexible heating element 130 proximate the consolidated laminate sheet 104. In the case of the system 200, positioning the flexible heating element 130 proximate the consolidated laminate sheet 104 at block 816 includes attaching the flexible heating element 130 to the consolidated laminate sheet 104. The consolidated laminate sheet 104 is heated by the plurality of heaters 132 of the flexible heating element 130, with each one of the plurality of heaters 132 heating a corresponding section of the consolidated laminate sheet 104. Because the flexible heating element 130 is in close proximity to the consolidated laminate sheet 104, by virtue of the flexible heating element 130 being attached to the consolidated laminate sheet 104, the heat 124 from the flexible heating element 130 directly heats the consolidated laminate sheet 104 in an efficient manner.

According to some examples, block 802 of the method 800 is accomplished by (block 818) flexing the flexible heating element 130 to conform to the shape of the heated consolidated laminate sheet 104A as the heated consolidated laminate sheet 104A is forced against the contoured forming surface 103 of the mold 102. In the system 200, as shown in FIG. 5, the flexible heating element 130 flexes by enabling the plurality of heaters 132 to pivot relative to each other in response to the deformation of corresponding sections of the heated consolidated laminate sheet 104A to which the heaters 132 are attached. By conforming to the shape of the heated consolidated laminate sheet 104A, the predetermined distance between the plurality of heaters 132 and the heated consolidated laminate sheet 104A is maintained and the heat 124 generated by the plurality of heaters 132 continues to directly heat the heated consolidated laminated sheet 104A in an efficient manner as the heated consolidated laminate sheet 104A deforms into the contoured shape of the part 104B.

Figure 6:
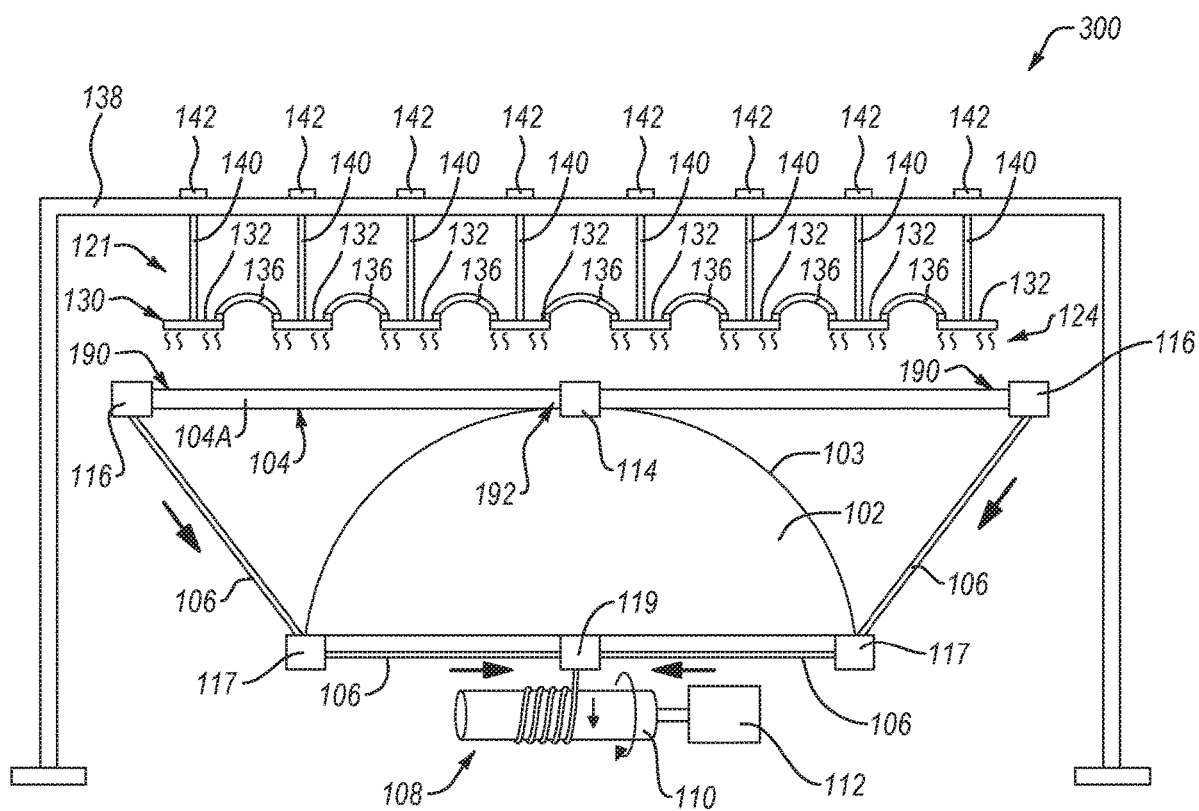
FIG. 6 is a schematic, elevation view of a system for manufacturing a part, according to one or more examples of the present disclosure.
Figure 7:
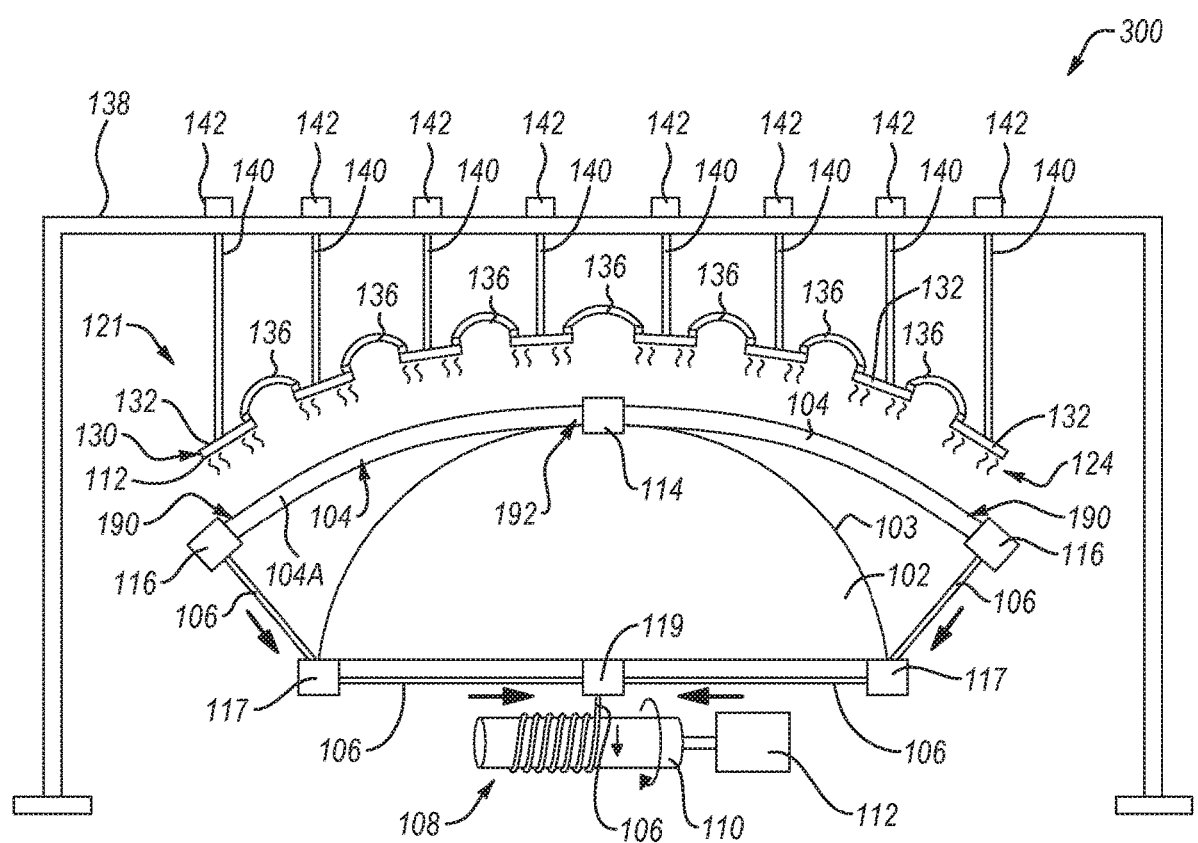
FIG. 7 is a schematic, elevation view of the system of FIG. 6, showing a partial deformation of a heated consolidated laminate sheet, according to one or more examples of the present disclosure.

Referring to FIGS. 6 and 7, according to some examples, a system 300 for manufacturing a part 104B is shown. The system 300 includes some features analogous to the system 200 of FIGS. 4 and 5, with like numbers referring to like features. For example, like the system 200, the system 300 includes the mold 102, the tension straps 106, the first fixation component 114, the second fixation components 116, the third fixation components 117, the fourth fixation component 119, the strap retraction mechanism 108, and the flexible heating element 130.

However, unlike the system 200, the system 300 includes an overhead support structure 138 and the flexible heating element 130 is not attached to the consolidated laminate sheet 104. Rather, the flexible heating element 130 overhangs the consolidated laminate sheet 104 at a predetermined distance away from the consolidated laminate sheet 104. Similar to the flexible heating element 130 of the system 200, the flexible heating element 130 of the system 300 includes a plurality of heaters 132 and a plurality of hinges 136 each pivotably coupling adjacent ones of the plurality of heaters 132. However, instead of stand-offs, the flexible heating element 130 of the system 300 includes a plurality of overhang straps 140 that hang from the overhead support structure 138 above the consolidated laminate sheet 104. Each one of the plurality of overhang straps 140 is coupled with a corresponding one of the plurality of heaters 132. Moreover, the flexible heating element 130 of the system 200 further includes a plurality of strap extension mechanisms 142 each operably coupled with a corresponding one of the plurality of overhang straps 140. The strap extension mechanisms 142 are coupled to the overhead support structure 138 and each one of the strap extension mechanisms 142 is operable to extend the overhang strap 140 operably coupled with strap extension mechanism 142. The strap extension mechanisms 142 are independently and selectively operable relative to each other to enable extension of (e.g., lengthening of) the overhang straps 140 at different rates or amounts.

Referring to FIGS. 6, 7, and 20, when executed in association with the system 300, positioning the flexible heating element 130 proximate the consolidated laminate sheet 104 at block 816 includes attaching the flexible heating element 130 to the overhead support structure 138. Because the flexible heating element 130 is in close proximity to the consolidated laminate sheet 104, by virtue of the flexible heating element 130 being hung over the consolidated laminate sheet 104, the heat 124 from the flexible heating element 130 directly heats the consolidated laminate sheet 104 in an efficient manner. According to some examples of the system 300, as shown in FIG. 7, the flexible heating element 130 flexes in accordance with block 818 of the method 800 by enabling the individual lengthening of the plurality of overhang straps 140 to move the corresponding heaters 132 relative to each other, at different rates or amounts, in response to the deformation of corresponding sections of the heated consolidated laminate sheet 104A over which the heaters 132 are hung. By conforming to the shape of the heated consolidated laminate sheet 104A, the predetermined distance between the plurality of heaters 132 and the heated consolidated laminate sheet 104A is maintained and the heat 124 generated by the plurality of heaters 132 continues to directly heat the heated consolidated laminated sheet 104A in an efficient manner as the heated consolidated laminate sheet 104A deforms into the contoured shape of the part 104B.

Figure 8:
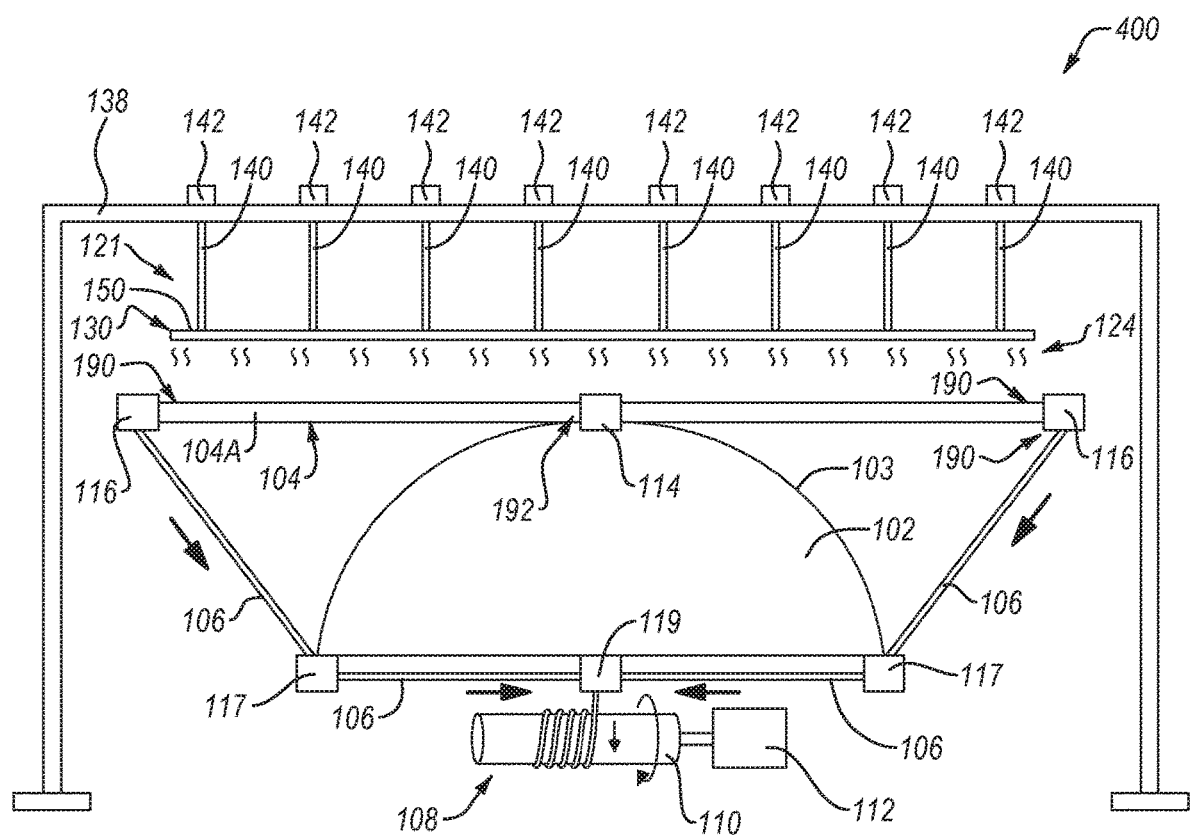
FIG. 8 is a schematic, elevation view of a system for manufacturing a part, according to one or more examples of the present disclosure.
Figure 9:
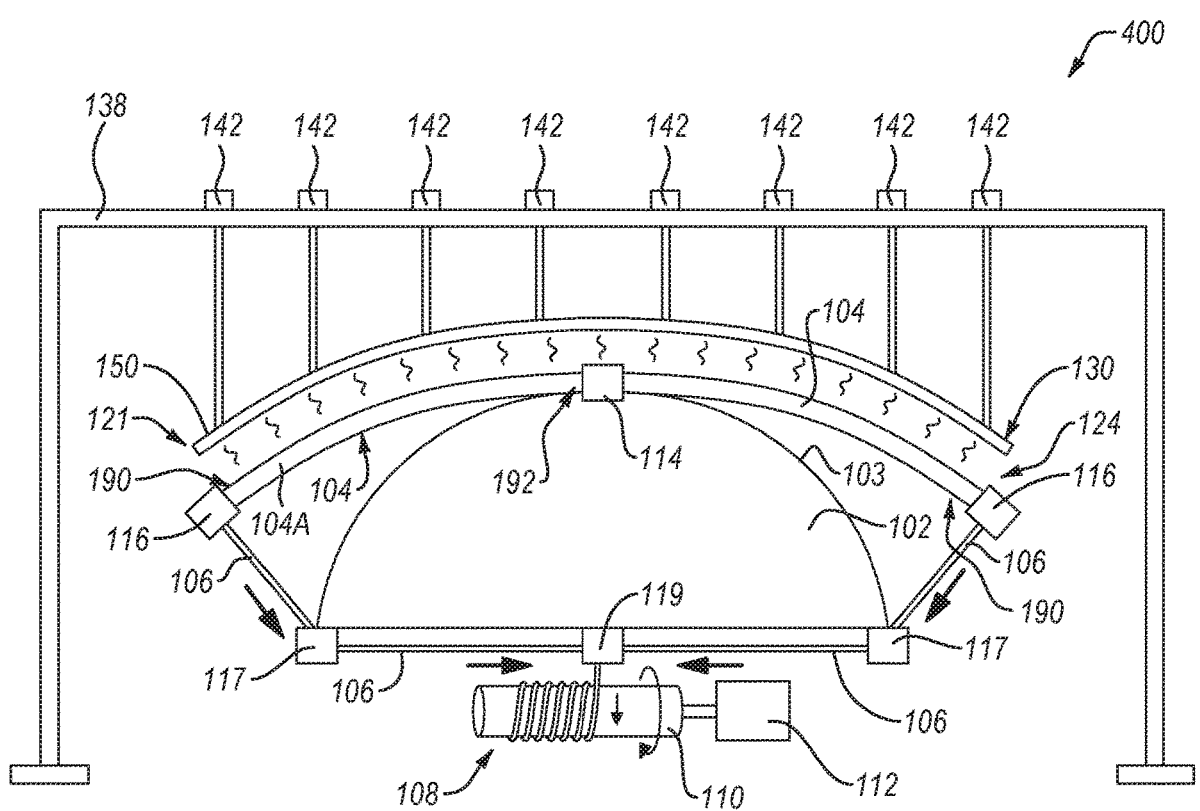
FIG. 9 is a schematic, elevation view of the system of FIG. 8, showing a partial deformation of a heated consolidated laminate sheet, according to one or more examples of the present disclosure.

Referring to FIGS. 8 and 9, according to some examples, a system 400 for manufacturing a part 104B is shown. The system 400 includes some features analogous to the system 300 of FIGS. 6 and 7, with like numbers referring to like features. For example, like the system 300, the system 400 includes the mold 102, the tension straps 106, the first fixation component 114, the second fixation components 116, the third fixation components 117, the fourth fixation component 119, the strap retraction mechanism 108, the flexible heating element 130, the overhang straps 140, the strap extension mechanisms 142, and the overhead support structure 138. However, unlike the system 300, the flexible heating element 130 of the system 400 includes a heat blanket 150 instead of a plurality of heaters 132 that are pivotably connected. According to one example, the heat blanket 150 includes a flexible fabric and a series of resistance wires embedded in the flexible fabric. In other examples, the heat blanket 150 is a chopped carbon-fiber mat. The flexibility of the heat blanket 150 is such that the heat blanket 150 is configured to flex under normal gravitational loads. The heat blanket 150 overhangs the consolidated laminate sheet 104 at a predetermined distance away from the consolidated laminate sheet 104 via the plurality of overhang straps 140 that hang from the overhead support structure 138. Each one of the plurality of overhang straps 140 is coupled with a corresponding section of the heat blanket 150.

Referring to FIGS. 8, 9, and 20, when executed in association with the system 400, positioning the flexible heating element 130 proximate the consolidated laminate sheet 104 at block 816 includes attaching the heat blanket 150 to the overhead support structure 138 via the overhang straps 140. Because the heat blanket 150 is in close proximity to the consolidated laminate sheet 104, by virtue of the heat blanket 150 being hung over the consolidated laminate sheet 104, the heat 124 from the heat blanket 150 directly heats the consolidated laminate sheet 104 in an efficient manner. According to some examples of the system 400, as shown in FIG. 9, the flexible heating element 130 flexes in accordance with block 818 of the method 800 by enabling the individual lengthening of the plurality of overhang straps 140 to move corresponding portions of the heat blanket 150 relative to each other, at different rates or amounts, in response to the deformation of corresponding sections of the heated consolidated laminate sheet 104A over which the heat blanket 150 is hung. By conforming to the shape of the heated consolidated laminate sheet 104A, the predetermined distance between the heat blanket 150 and the heated consolidated laminate sheet 104A is maintained and the heat 124 generated by the heat blanket 150 continues to directly heat the heated consolidated laminated sheet 104A in an efficient manner as the heated consolidated laminate sheet 104A deforms into the contoured shape of the part 104B.

Figure 10:
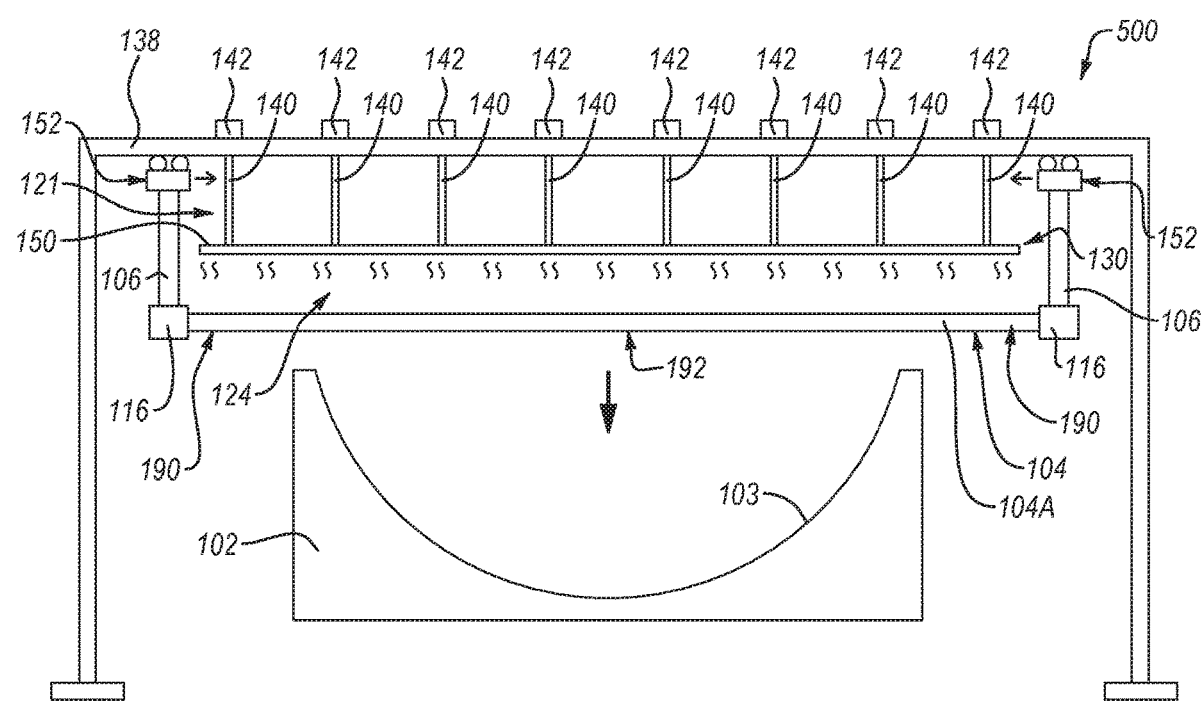
FIG. 10 is a schematic, elevation view of a system for manufacturing a part, according to one or more examples of the present disclosure.
Figure 11:
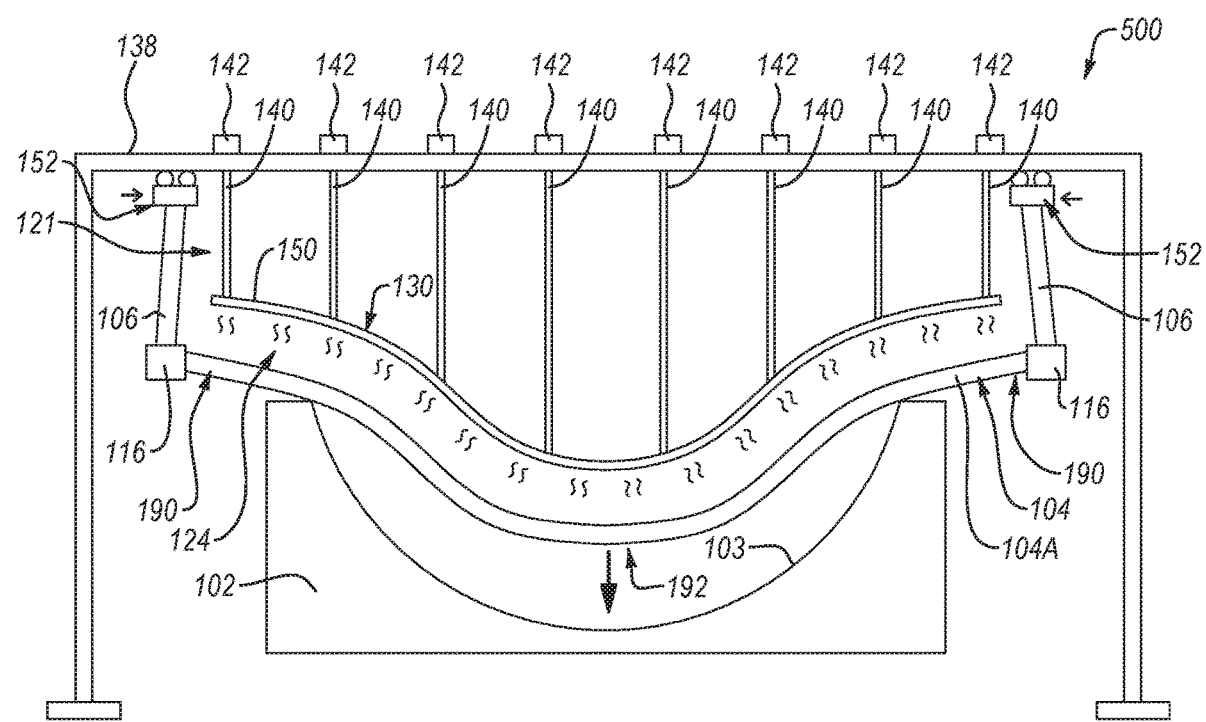
FIG. 11 is a schematic, elevation view of the system of FIG. 10, showing a partial deformation of a heated consolidated laminate sheet, according to one or more examples of the present disclosure.

Referring to FIGS. 10 and 11, according to some examples, a system 500 for manufacturing a part 104B is shown. The system 500 includes some features analogous to the system 400 of FIGS. 8 and 9, with like numbers referring to like features. For example, like the system 400, the system 500 includes the mold 102, the tension straps 106, the second fixation components 116, the heat blanket 150, the overhang straps 140, the strap extension mechanisms 142, and the overhead support structure 138.

However, unlike the system 400, the system 500 does not include the third fixation components 117, the fourth fixation component 119, and the strap retraction mechanism 108. Instead, the system 500 includes drive mechanisms 152 movably secured to the overhead support structure 138. The drive mechanisms 152 are attached to the opposing end portions 190 of the consolidated laminate sheet 104 by corresponding tension straps 106 and second fixation components 116. The drive mechanisms 152 each include a locomotion source, such as a motor, and wheels that are rotatable by the locomotion source. Accordingly, the drive mechanisms 152 act as powered trolleys. The wheels are engaged with a rail structure (not shown) forming part of the overhead support structure 138. The rail structure retains the wheels and guides the drive mechanisms 152 along a designated path. The locomotion sources are operable to drive the drive mechanisms 152 along the designated path toward the mold 102 or toward the intermediate portion 192 of the consolidated laminate sheet 104 as indicated by directional arrows in FIGS. 10 and 11. The tension straps 106 enable a pulling force generated by the drive mechanisms 152 to be transmitted to the opposing end portions 190 of the consolidated laminate sheet 104.

In contrast to the convex shape of the contoured forming surface 103 of the mold 102 of the system 400, the contoured forming surface 103 of the mold 102 of the system 500 is concave. Because the system 400 is configured to pull the consolidated laminate sheet 104 down over a convex forming surface, the system 400 is not sufficiently capable of forcing the heated consolidated laminate sheet 104A against the concave forming surface of the mold 102 of the system 500. Accordingly, as described below, the system 500 is particularly suited for forming parts using molds with concave forming surfaces.

Referring to FIGS. 10, 11, and 20, when executed in association with the system 500, the step at block 804 of forcing the heated consolidated laminate sheet 104A against the contoured forming surface 103 of the mold 102 includes (block 826) engaging the heated consolidated laminate sheet 104A via operation of the drive mechanisms 152 such that the heated consolidated laminate sheet 104A buckles into contact against the contoured forming surface 103 of the mold 102. Prior to executing block 826, the method 800 further includes (block 824) coupling the drive mechanisms 152 to the consolidated laminate sheet 104, such as via the tension straps 106 and the second fixation components 116.

Referring to FIG. 11, in one example, as the drive mechanisms 152 move toward each other and past the opposing end portion 190 of the heated consolidated laminate sheet 104A, the tension straps 106 pull the opposing end portions 190 toward each other, which creates a compressive force on the heated consolidated laminate sheet 104A. When sufficiently high, the compressive force causes the heated consolidated laminate sheet 104A to buckle or droop at the intermediate portion 192. Because the tension straps 106 apply a slightly upward force on the opposing end portions 190, the intermediate portion 192 buckles downwardly into the space defined by the contoured forming surface 103 of the mold 102. Further movement of the drive mechanisms 152 toward each other induces further downward buckling of the heated consolidated laminate sheet 104A until the heated consolidate laminate sheet 104A is forced against the contoured forming surface 103 of the mold 102 and takes the shape of the contoured forming surface 103.

Accordingly, in one example, the drive mechanisms 152 engage the heated consolidated laminate sheet 104A by pulling the opposing end portions 190 of the heated consolidated laminate sheet 104A together. However, in other examples, the drive mechanisms 152 are configured to engage the heated consolidated laminate sheet 104A by pushing the opposing end portions 190 of the heated consolidated laminate sheet 104A together. For example, the tension straps 106 of the system 500 can be rigid, such that as the drive mechanisms 152 move toward each other the tension straps 106 push against the opposing end portions 190 of the heated consolidated laminate sheet 104A.

The system 500 includes at least two drive mechanisms 152 operable to move toward each other to cause: the two opposing end portions 190 of the consolidated laminate sheet 104 to move toward each other; and the intermediate portion 192 of the consolidated laminate sheet 104 to buckle toward the contoured forming surface 103 of the mold 102. Although FIGS. 10-11 illustrate two drive mechanisms 152, in other examples, the system 500 can include more than two drive mechanisms 152.

Figure 12:
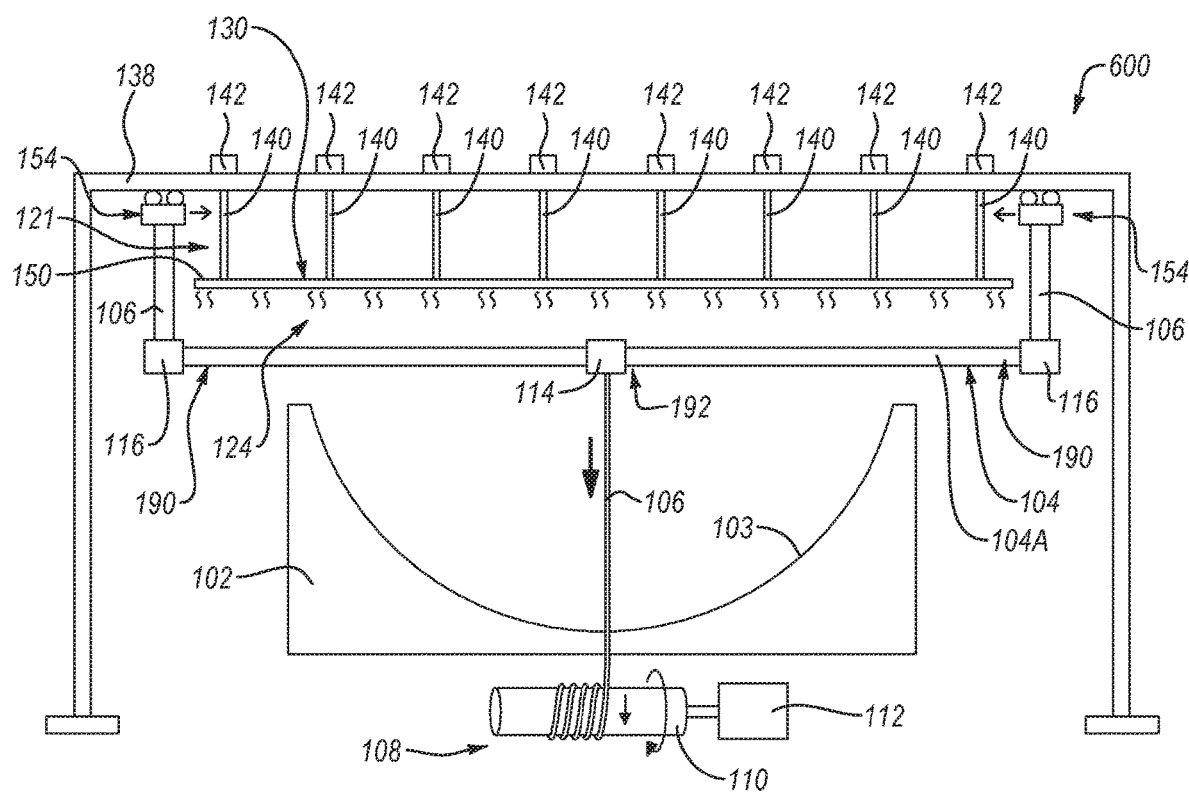
FIG. 12 is a schematic, elevation view of a system for manufacturing a part, according to one or more examples of the present disclosure.
Figure 13:
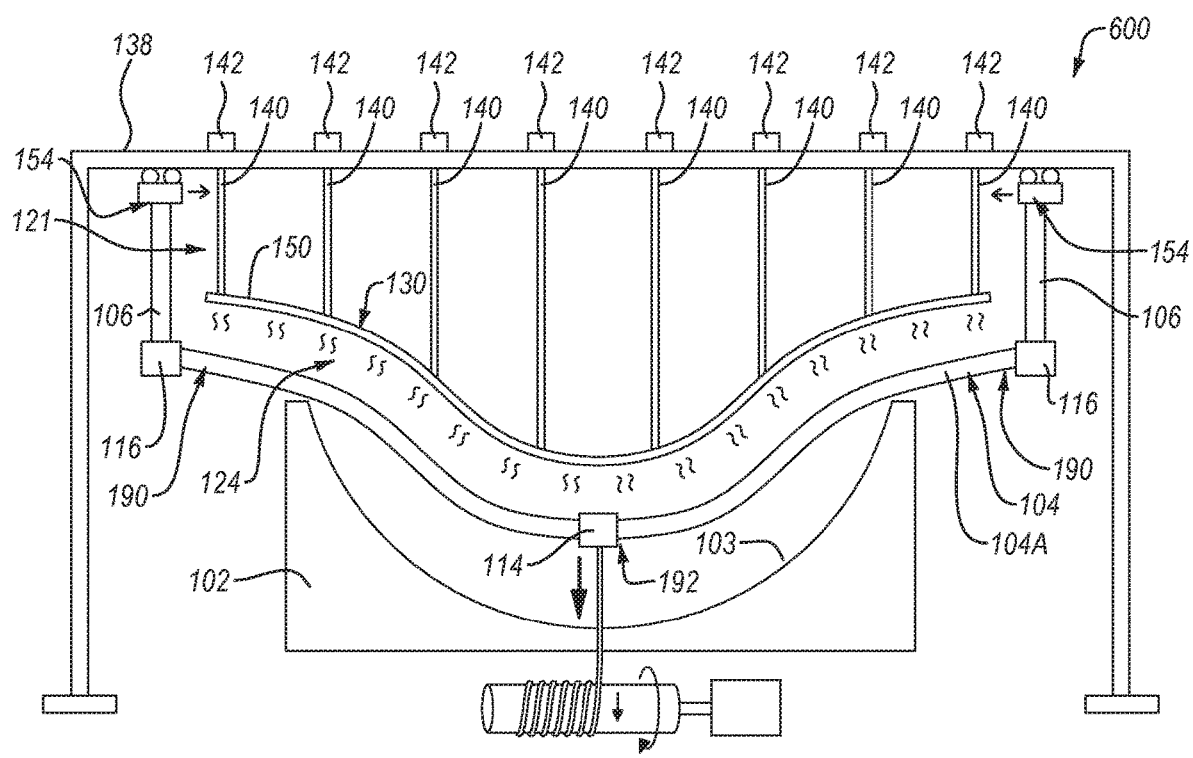
FIG. 13 is a schematic, elevation view of the system of FIG. 12, showing a partial deformation of a heated consolidated laminate sheet, according to one or more examples of the present disclosure.

Referring to FIGS. 12 and 13, according to some examples, a system 600 for manufacturing a part 104B is shown. The system 600 includes some features analogous to the system 500 of FIGS. 9 and 10, with like numbers referring to like features. For example, like the system 500, the system 600 includes the mold 102 (with a contoured forming surface 103 that is concave-shaped), the tension straps 106, the second fixation components 116, the heat blanket 150, the overhang straps 140, the strap extension mechanisms 142, and the overhead support structure 138.

However, unlike the system 500, the system 600 further includes an additional tension strap 106, a strap retraction mechanism 108, a first fixation component 114. Additionally, instead of the drive mechanisms 152, the system 600 includes guide mechanisms 154. The guide mechanisms 154 are movably secured to the overhead support structure 138. Moreover, the guide mechanisms 154 are attached to the opposing end portions 190 of the consolidated laminate sheet 104 by corresponding tension straps 106 and second fixation components 116.

Unlike the drive mechanisms 152, each one of the guide mechanisms 154 does not include a locomotion source, but rather are passively movably secured to the overhead support structure 138 via wheels of the guide mechanism 154. Accordingly, the guide mechanisms 154 act as passive trolleys. The wheels of the guide mechanisms 154 are engaged with a rail structure (not shown) forming part of the overhead support structure 138. The rail structure retains the wheels and guides the guide mechanisms 154 along a designated path. The tension straps 106 help to anchor the opposing end portions 190 relative to the overhead support structure 138 by maintaining a vertical position of the opposing end portions 190 within a designated range relative to the overhead support structure 138. Anchoring the opposing end portions 190 in this manner helps to ensure that the intermediate portion 192 of the heated consolidated laminate sheet 104A buckles downwardly into the space defined by the contoured forming surface 103 of the mold 102.

Referring to FIGS. 12, 13, and 20, when executed in association with the system 600, the step at block 804 of forcing the heated consolidated laminate sheet 104A against the contoured forming surface 103 of the mold 102 includes (block 822) pulling, via operation of the strap retraction mechanism 108, the tension strap 106 attached to the first fixation component 114. Referring to FIG. 13, in one example, as the strap retraction mechanism 108 retracts the tension strap 106 and the tension strap 106 correspondingly pulls down on the intermediate portion 192 of the heated consolidated laminate sheet 104A, the heated consolidated laminate sheet 104A buckles at the intermediate portion 192. Continued pulling of the intermediate portion 192 of the heated consolidated laminate sheet 104A by the strap retraction mechanisms 108 induces further downward buckling of the heated consolidated laminate sheet 104A until the heated consolidate laminate sheet 104A is forced against the contoured forming surface 103 of the mold 102 and takes the shape of the contoured forming surface 103.

Although the flexible heating element 130 of FIGS. 10-13 includes a heat blanket 150, in other examples, the heat blanket 150 can be replaced by multiple interconnected heaters 132, such as shown in FIGS. 6 and 7.

Figure 14:
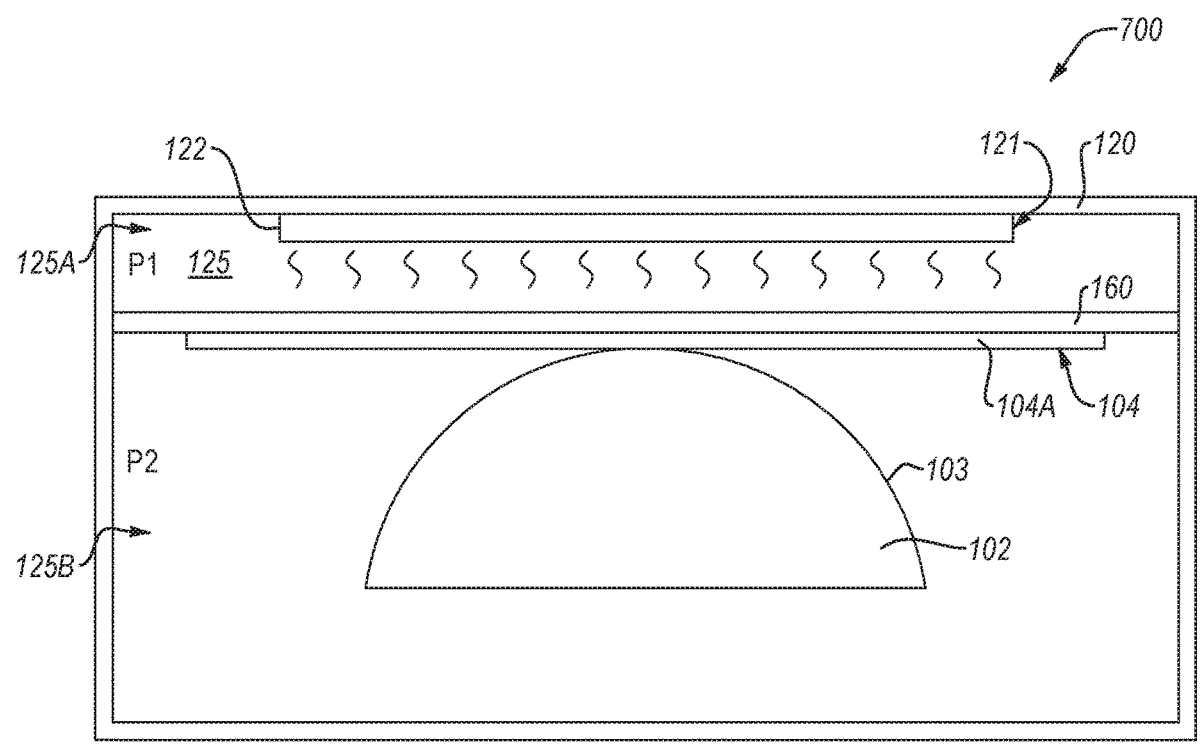
FIG. 14 is a schematic, elevation view of a system for manufacturing a part, according to one or more examples of the present disclosure.
Figure 15:
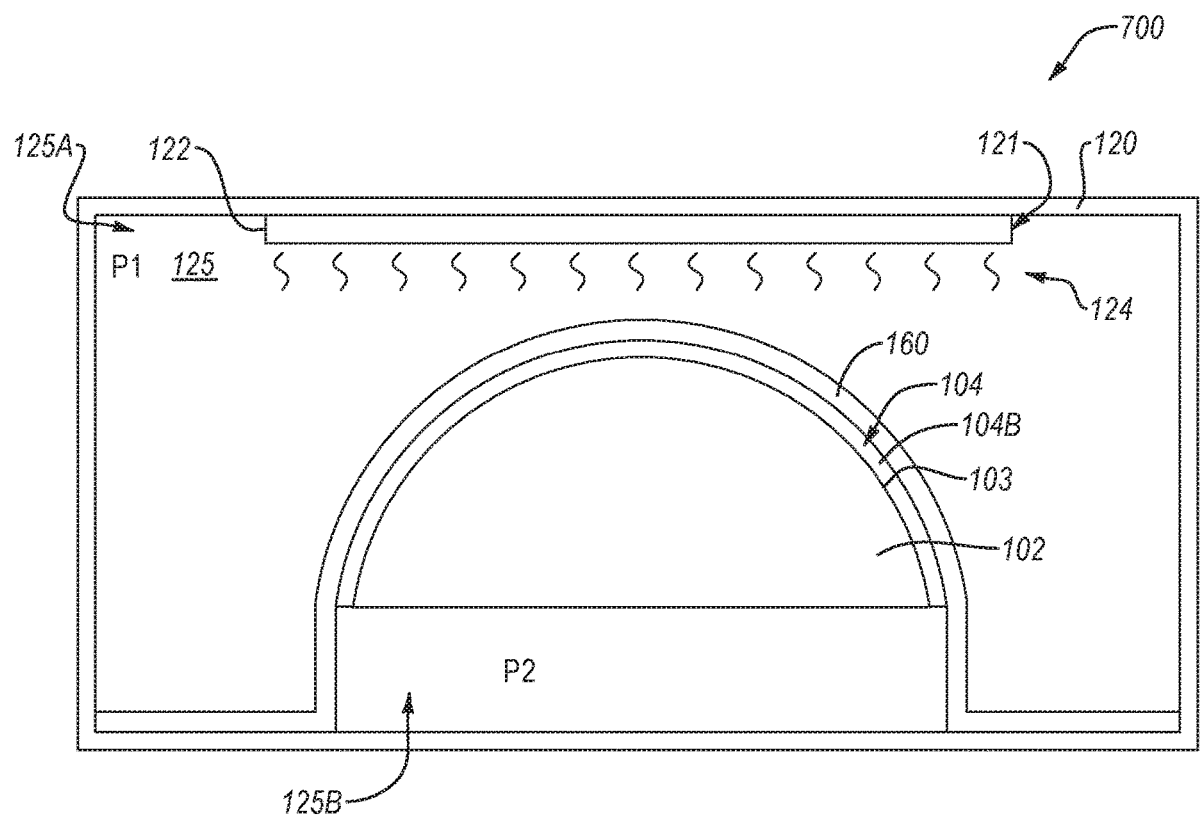
FIG. 15 is a schematic, elevation view of the system of FIG. 14, showing a full deformation of a heated consolidated laminate sheet, according to one or more examples of the present disclosure.

Referring to FIGS. 14 and 15, according to certain examples, a system 700 for manufacturing a part 104B is shown. The system 700 includes some features analogous to the system 100 of FIGS. 1-3, with like numbers referring to like features. For example, like the system 100, the system 700 includes the mold 102, the enclosed container 120, and the heating assembly 121. The heating assembly 121 is configured to heat the interior cavity 125 of the enclosed container 120. However, unlike the system 100, the system 700 does not use tension straps 106 or a strap retraction mechanism 108 to help shape the consolidated laminate sheet 104. Instead, the system 700 includes at least one flexible diaphragm 160 and utilizes a pressure differential to help shape the consolidated laminate sheet 104.

The flexible diaphragm 160 hermetically divides the interior cavity 125 of the enclosed container 120 into a first region 125A and a second region 125B. Accordingly, when executed in association with the system 700, in addition to performing blocks 802, 804, and 806, the method 800 further includes (block 810) hermetically dividing the interior cavity 125 of the enclosed container 120 into the first region 125A and the second region 125B. Accordingly, the first region 125A is hermetically sealed from the second region 125B by the flexible diaphragm 160. In this example, block 806 of the method 800 includes (block 812) positioning the consolidated laminate sheet 104 and the mold 102 within the second region 125B of the interior cavity 125. The consolidated laminate sheet 104 is arranged relative to the mold 102 such that the consolidated laminate sheet 104 is interposed between the flexible diaphragm 160 and the contoured forming surface 103 of the mold 102. Although the contoured forming surface 103 of the mold 102 in the system 700 is convex-shaped, in other examples, the contoured forming surface 103 is concave-shaped.

In this example, block 804 of the method 800 includes (block 814) changing a pressure within at least one of the first region 125A and the second region 125B such that the pressure P1 within the first region 125A is greater than the pressure P2 within the second region 125B to urge the flexible diaphragm 160 against the heated consolidated laminate sheet 104A (see, e.g., FIG. 15). According to certain implementations, to reduce the need for pressurization equipment, the pressure differential between the first region 125A and the second region 125B is generated by maintaining the pressure P1 of the first region 125A at atmospheric pressure and reducing the pressure P2 of the second region 125B. However, in some implementations, the pressure P1 in the first region 125A can be greater than atmospheric and the pressure P2 in the second region 125B can be maintained at atmospheric pressure.

Figure 18:
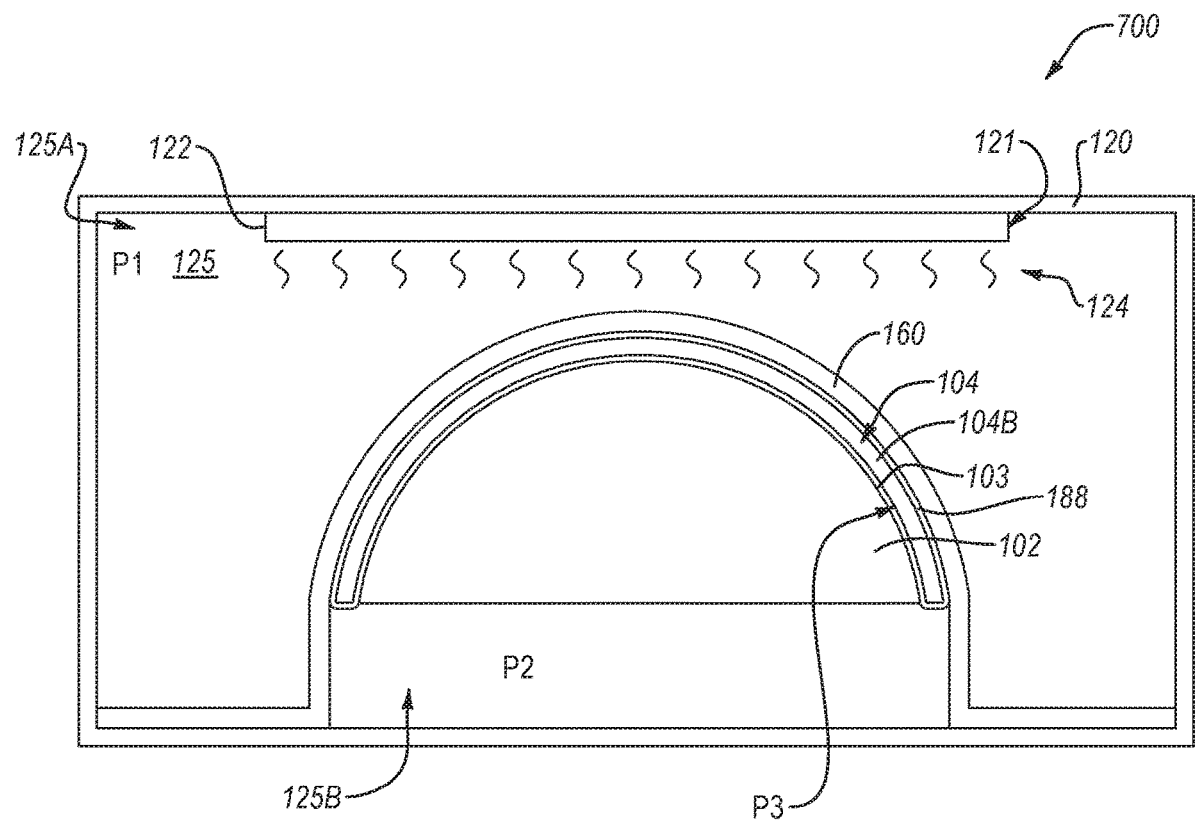
FIG. 18 is a schematic, elevation view of a system for manufacturing a part, according to one or more examples of the present disclosure.

To help prevent delamination and aid in the shaping process, in some examples, as shown in FIG. 18, an envelope bag 188 envelopes the consolidated laminate sheet 104. A pressure P3 within the envelope bag 188 can be reduced to apply a vacuum to the consolidated laminate sheet 104. The vacuum uniformly compresses the consolidated laminate sheet 104 in all directions to help maintain the lamination of the plies 180 by pressing the plies 180 together while the consolidated laminate sheet 104 is shaped to the mold 102 according to the method 800. In some examples, the pressure P3 within the envelope bag 188 is less than the pressure P2 of the second region 125B of the interior cavity 125.

Figure 19:
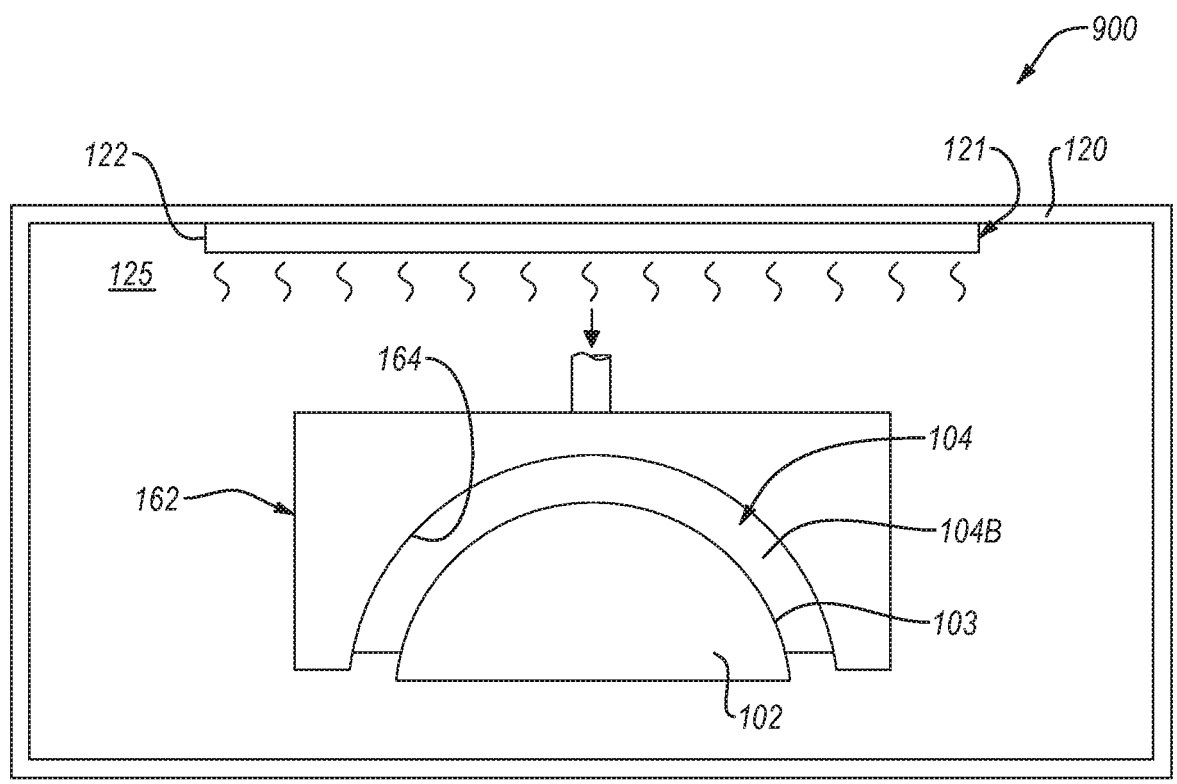
FIG. 19 is a schematic, elevation view of a system for manufacturing a part, according to one or more examples of the present disclosure.

Referring to FIG. 19, according to certain examples, a system 900 for manufacturing a part 104B is shown. The system 900 includes the mold 102, the enclosed container 120, and the heating assembly 121. The heating assembly 121 is configured to heat the interior cavity 125 of the enclosed container 120. The system 900 also includes a mating mold 162 that includes a second contoured forming surface 164. The shape of the second contoured forming surface 164 of the mating mold 162 complements the shape of the contoured forming surface 103 of the mold 102. In operation, block 804 of the method 800 is accomplished by pressing the consolidated laminate sheet 104 against the contoured forming surface 103 of the mold 102 with the mating mold 162. In other words, the mating mold 162 moves relative to the mold 102 to compress the consolidated laminate sheet 104 between the mold 102 and the mating mold 162, which deforms the consolidated laminate sheet 104 into the part 104B. The pressure, applied by the mating mold 162, necessary to form the part 104B is much less than conventional methods, which require at least 100 psi. According to some examples, the pressure, applied by the mating mold 162, necessary to form the part 104B is between 10 psi and 15 psi.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagram. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A system for manufacturing a part, the system comprising:
   a mold, comprising a contoured forming surface;
   a first fixation component, fixed to the contoured forming surface of the mold;
   second fixation components, each configured to be fixed to a corresponding one of two opposite ends of a consolidated laminate sheet;
   third fixation components, each fixed to the mold at spaced-apart locations on the mold;
   tension straps, wherein:
      the first fixation component is configured to attach the consolidated laminate sheet to the forming surface of the mold so that the consolidated laminate sheet does not translationally move relative to the forming surface of the mold;
      each one of the second fixation components is configured to attach a corresponding one of the tension straps to a corresponding one of the two opposite ends of the consolidated laminate sheet so that each one of the two opposite ends of the consolidated laminate sheet co-move relative to a respective one of the tension straps; and
      each one of the third fixation components is configured to attach a corresponding one of the tension straps to the mold so that the tension straps are movable relative to the mold;
   a heating assembly, positioned relative to the mold and configured to supply heat to the consolidated laminate sheet, when attached to the tension straps, to form a heated consolidated laminate sheet; and
   a strap retraction mechanism, configured to retract the tension straps, when attached to the consolidated laminate sheet via the second fixation components, to force the heated consolidated laminate sheet against the contoured forming surface of the mold.

2. The system according to claim 1, further comprising an enclosed container, defining an interior cavity, wherein:
   the mold, the tension straps, the heating assembly, and the strap retraction mechanism are enclosed within the enclosed container; and
   the heating assembly comprises a heater, which is non-movably fixed relative to the enclosed container.

3. The system according to claim 2, wherein the enclosure has a fixed shape so that the enclosure does not move relative to the mold.

4. The system according to claim 2, wherein a volume of the interior cavity of the enclosure is fixed.

5. The system according to claim 3, wherein the interior cavity is at atmospheric pressure.

6. The system according to claim 1, wherein the first fixation component comprises a clamp configured to releasably clamp the consolidated laminate sheet to the mold.

7. The system according to claim 1, wherein the first fixation component comprises a fastener that penetrates the consolidated laminate sheet and fastens to the mold to attach the consolidated laminate sheet to the forming surface of the mold.

8. The system according to claim 1, wherein, when the consolidated laminate sheet is attached to the forming surface of the mold via the first fixation component and when the second fixation components are attached to the two opposite ends of the consolidated laminate sheet, the first fixation component is attached to an intermediate portion of the consolidated laminate sheet, which is equidistant from the two opposite ends of the consolidated laminate sheet.

9. The system according to claim 1, wherein each one of the second fixation components is one of a clamp, a fastener, or a pull ring.

10. The system according to claim 1, wherein each one of the tension straps is an interwoven strip of fabric.

11. The system according to claim 1, wherein:
the strap retraction mechanism comprises a rotatable drum; and
the tension straps are engaged with the rotatable drum such that rotation of the rotatable drum causes the tension straps to wind onto the rotatable drum.

12. The system according to claim 11, further comprising a motor coupled to the rotatable drum, wherein the motor is selectively operable to rotate the rotatable drum.

13. The system according to claim 1, further comprising a fourth fixation component fixed to the mold, wherein:
the fourth fixation component is configured to attach the tension straps to the mold so that the tension straps are movable relative to the mold; and
the tension straps converge at the fourth fixation component.

14. The system according to claim 13, wherein the fourth fixation component is located between the third fixation components.

15. The system according to claim 13, wherein portions of the tension straps between the second fixation components and the third fixation components are angled relative to portions of the tension straps between the third fixation components and the fourth fixation component.

16. The system according to claim 1, wherein:
the second fixation components are spaced a first distance apart;
the third fixation components are spaced a second distance apart; and
the first distance is greater than the second distance.

17. The system according to claim 1, wherein:
the system comprises the consolidated laminate sheet;
the consolidated laminate sheet is made of a plurality of plies in a stacked arrangement; and
each one of the plurality of plies is made of a thermoplastic polymer.

18. The system according to claim 17, wherein each one of the plurality of plies is made of fibers embedded in the thermoplastic resin.

19. The system according to claim 17, wherein the consolidated laminate sheet is flat when the second fixation components are fixed to the consolidated laminate sheet and before the strap retraction mechanism retracts the tension straps.

20. The system according to claim 18, wherein the heating assembly comprises a heater that is selectively operable to heat the thermoplastic resin above a heat deflection temperature of the thermoplastic resin and below a melting temperature of the thermoplastic resin.

* * * * *